US012320097B2

(12) United States Patent
Takagawa et al.

(10) Patent No.: US 12,320,097 B2
(45) Date of Patent: Jun. 3, 2025

(54) WORK MACHINE

(71) Applicant: Hitachi Construction Machinery Co., Ltd., Tokyo (JP)

(72) Inventors: Naoya Takagawa, Tsuchiura (JP); Kento Kumagai, Ami-machi (JP); Mitsuhiko Kanehama, Kasumigaura (JP); Hiroaki Amano, Tsukuba (JP); Ryousuke Itou, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 18/281,450

(22) PCT Filed: Mar. 11, 2022

(86) PCT No.: PCT/JP2022/011142

§ 371 (c)(1),
(2) Date: Sep. 11, 2023

(87) PCT Pub. No.: WO2023/053502

PCT Pub. Date: Apr. 6, 2023

(65) Prior Publication Data

US 2024/0151003 A1 May 9, 2024

(30) Foreign Application Priority Data

Sep. 30, 2021 (JP) ................................ 2021-162384

(51) Int. Cl.
*E02F 9/22* (2006.01)

(52) U.S. Cl.
CPC .......... *E02F 9/2203* (2013.01); *E02F 9/2221* (2013.01); *E02F 9/2235* (2013.01);
(Continued)

(58) Field of Classification Search
CPC ..... E02F 9/2203; E02F 9/2221; E02F 9/2235; F15B 2211/20553; F15B 2211/428
See application file for complete search history.

(56) References Cited

U.S. PATENT DOCUMENTS

| | | | |
|---|---|---|---|
| 11,001,985 | B2 | 5/2021 | Ito et al. |
| 2008/0201045 | A1 | 8/2008 | Kagoshima et al. |

(Continued)

FOREIGN PATENT DOCUMENTS

| | | | |
|---|---|---|---|
| JO | 2020-33815 | A | 3/2020 |
| JP | 8-145007 | A | 6/1996 |

(Continued)

OTHER PUBLICATIONS

International Search Report (PCT/ISA/210) issued in PCT Application No. PCT/JP2022/011142 dated May 31, 2022 with English translation (6 pages).

(Continued)

*Primary Examiner* — Matthew Wiblin
(74) *Attorney, Agent, or Firm* — Crowell & Moring LLP

(57) ABSTRACT

A controller of a work machine computes a requested velocity of a hydraulic actuator based on an operation signal, computes a first estimated velocity of the hydraulic actuator based on a sensed value of a first sensing device that senses motion information of a driven member, computes a second estimated velocity of the hydraulic actuator based on a sensed value of a second sensing device that senses a flow rate of a directional control valve, computes an arbitrated velocity by arbitrating the first estimated velocity and the second estimated velocity according to a driving state of the hydraulic actuator, and controls the directional control valve based on a deviation between the requested velocity and the arbitrated velocity. The computation of the arbitrated velocity is to perform an arbitration such that a degree of effect on the second estimated velocity is larger than a degree of effect
(Continued)

on the first estimated velocity when the hydraulic actuator starts to move, and to perform an arbitration such that the degree of effect on the first estimated velocity is larger than the degree of effect on the second estimated velocity when the driving of the hydraulic actuator is approaching a steady state.

5 Claims, 8 Drawing Sheets

(52) U.S. Cl.
CPC ........... *E02F 9/2285* (2013.01); *E02F 9/2296* (2013.01); *F15B 2211/20553* (2013.01); *F15B 2211/428* (2013.01)

(56) References Cited

U.S. PATENT DOCUMENTS

2018/0282969 A1* 10/2018 Hita ...................... F15B 19/002
2020/0217050 A1* 7/2020 Chiba ..................... E02F 3/435
2021/0222395 A1* 7/2021 Matsuyama ............ E02F 3/435
2021/0230843 A1* 7/2021 Takeuchi ................ E02F 9/265
2021/0332561 A1* 10/2021 Kozui ................... E02F 9/2203

FOREIGN PATENT DOCUMENTS

JP 9-242708 A 9/1997
JP 11-181840 A 7/1999
JP 2008-231903 A 10/2008
JP 2019-19567 A 2/2019
JP 2019-157521 A 9/2019

OTHER PUBLICATIONS

Japanese-language Written Opinion (PCT/ISA/237) issued in PCT Application No. PCT/JP2022/011142 dated May 31, 2022 with English translation (7 pages).
International Preliminary Report on Patentability (PCT/IB/338 & PCT/IB/373) issued in PCT Application No. PCT/JP2022/011142 dated Apr. 11, 2024, including English translation of Written Opinion (PCT/ISA/237) (5 pages).
Extended European Search Report issued in European Application No. 22875385.1 dated Jan. 21, 2025 (10 pages).

* cited by examiner

WORK MACHINE

TECHNICAL FIELD

The present invention relates to a work machine, and more particularly relates to a work machine that controls the driving of hydraulic actuators.

BACKGROUND ART

In a work machine such as a hydraulic excavator, a work device constituted by joining together a plurality of driven members (link members) such as a boom, an arm, and a bucket is driven by a plurality of hydraulic actuators. As a technology for improving work efficiency of the hydraulic excavator, an intelligent construction system is known which performs work such as finishing excavation by automatically or semiautomatically actuating the work device through the use of an information and communication technology. In the intelligent construction system, a distal end (claw tip) of the bucket of the work device is desired to be controlled accurately in order to enhance finishing accuracy of a construction surface with respect to a design surface. Therefore, the hydraulic excavator needs to accurately control the driving velocity of each hydraulic actuator that actuates the work device and the flow rate of hydraulic fluid flowing into each hydraulic actuator (which flow rate may hereinafter be referred to as a meter-in flow rate).

A technology described in Patent Document 1 is known as an example of a method for accurately controlling the motion of the work device. A construction machine described in Patent Document 1 executes feedback control using a motion state amount (a speed or a position) of a combined center of gravity of the work device which motion state amount is obtained from an actually measured value of a sensor that measures the speed, angle, position, or the like of each member (the boom, the arm, and the like) of the work device and driving torque of the hydraulic actuator obtained from an actually measured value of a stroke length, pressure, or the like of each hydraulic actuator measured by a sensor. The motion state amount of the combined center of gravity of the work device is thereby controlled so as to follow a target value.

In addition, a technology described in Patent Document 2 is known as another example of the method for accurately controlling the motion of the work device. An excavator described in Patent Document 2 estimates the flow rate of hydraulic operating fluid passing through a control valve (passing flow rate) by using a displacement of a spool of a control valve sensed by a spool displacement sensor attached to the control valve that controls the flow rate of the hydraulic operating fluid flowing from a hydraulic pump to the hydraulic actuator, and feeds back an estimated value of the passing flow rate of the control valve. The passing flow rate of the control valve (that is, the meter-in flow rate of the hydraulic actuator) is thereby controlled so as to follow a target value.

PRIOR ART DOCUMENT

Patent Documents

Patent Document 1: JP-2020-033815-A
Patent Document 2: JP-2019-157521-A

SUMMARY OF THE INVENTION

Problems to be Solved by the Invention

In a case where the control to make the velocity of the hydraulic actuator follow a target value is performed by feeding back the velocity of the hydraulic actuator directly derived from the actually measured value of the sensor that measures the velocity, angle, position, or the like of the work device (for example, a posture sensor that can sense the posture of the work device) as in the control of the construction machine described in Patent Document 1, a control amount (correction amount) is determined according to an actual driving state of the hydraulic actuator (work device) in principle. Therefore, when an operation with a large operation amount and with a quick rise is input to an operation device, the velocity of the hydraulic actuator obtained from the actually measured value of the sensor greatly deviates at a start of movement of the work device from the target value corresponding to the operation amount of the operation device due to an effect of a response delay of the hydraulic actuator caused by the inertia of the work device or the like. In this case, a correction amount of the feedback control becomes excessive, and the jumping out or hunting of the hydraulic actuator tends to occur. That is, in the case where the velocity of the hydraulic actuator derived directly from the actually measured value of the sensor is fed back, there is a fear of impairing stability of the control of the hydraulic actuator in conditions, where the fed-back velocity of the hydraulic actuator greatly deviates from the target value, such as at a start of movement of the hydraulic actuator.

On the other hand, in a case where the control to make the meter-in flow rate follow the target value is performed by feeding back the passing flow rate of the control valve (meter-in flow rate of the hydraulic actuator) estimated on the basis of a sensed value of the spool displacement sensor, as in the control of the excavator described in Patent Document 2, a control amount (correction amount) can be determined by predicting a future driving state of the hydraulic actuator. Therefore, even when an operation with a large operation amount and with a quick rise is input, the meter-in flow rate can be corrected before the hydraulic actuator actually starts to move. The jumping out or hunting of the hydraulic actuator can therefore be suppressed more than in the case of the control described in Patent Document 1.

However, the estimated value of the passing flow rate of the control valve (meter-in flow rate of the hydraulic actuator) using the sensed value of the spool displacement sensor uses a hydrodynamic relational equation or the like, and thus tends to invite a decrease in estimation accuracy due to effects of disturbances such as oil temperature and cavitation and the sensing accuracy of the sensor. Therefore, the accuracy of the feedback control using the meter-in flow rate of the hydraulic actuator estimated on the basis of the sensed value of the spool displacement sensor tends to be inferior to the accuracy of the feedback control using the velocity of the hydraulic actuator obtained directly from the actually measured value of the sensor as in the control described in Patent Document 1, when the actual driving state of the hydraulic actuator approaches a target value.

The present invention has been made to solve the above-described problems. It is an object of the present invention to provide a work machine that can perform highly accurate control of a hydraulic actuator while ensuring control stability at a start of movement of the hydraulic actuator.

Means for Solving the Problems

The present application includes a plurality of means for solving the above-described problems. To cite an example of the means, there is provided a work machine including: a hydraulic pump that delivers hydraulic fluid; a hydraulic actuator that is driven by the hydraulic fluid supplied from the hydraulic pump; a directional control valve that controls a flow of the hydraulic fluid to be supplied from the hydraulic pump to the hydraulic actuator; a driven member that is actuated by driving of the hydraulic actuator; an operation device that outputs an operation signal giving an instruction for motion of the driven member; a first sensing device that senses motion information of the driven member; a second sensing device that senses information related to a flow rate of the hydraulic fluid supplied to the hydraulic actuator via the directional control valve; and a controller that controls driving of the hydraulic pump and the directional control valve, wherein the controller is configured to compute a requested velocity of the hydraulic actuator based on the operation signal of the operation device, compute a velocity of the hydraulic actuator estimated based on a sensed value of the first sensing device, as a first estimated velocity, compute a velocity of the hydraulic actuator estimated based on a sensed value of the second sensing device, as a second estimated velocity, compute an arbitrated velocity by arbitrating the first estimated velocity and the second estimated velocity according to a driving state of the hydraulic actuator, and control the driving of the hydraulic pump and the directional control valve based on a deviation between the requested velocity and the arbitrated velocity, and the computation of the arbitrated velocity by the controller is to perform an arbitration such that a degree of effect on the second estimated velocity is larger than a degree of effect on the first estimated velocity when it can be determined on a basis of the first estimated velocity that the driving state of the hydraulic actuator is a state of starting to move, and perform an arbitration such that the degree of effect on the first estimated velocity is larger than the degree of effect on the second estimated velocity when it can be determined on the basis of the first estimated velocity that the driving state of the hydraulic actuator is approaching a steady state past a predetermined state.

Advantages of the Invention

According to the present invention, the driving of the hydraulic actuator is controlled using the second estimated velocity predicting a future driving state of the hydraulic actuator when the driving state of the hydraulic actuator is a state of starting to move. It is therefore possible to suppress the jumping out or hunting of the hydraulic actuator due to an effect of a response delay of the hydraulic actuator caused by the inertia of the driven member. In addition, the driving of the hydraulic actuator is controlled using the first estimated velocity derived on the basis of the actual driving state of the hydraulic actuator when the driving of the hydraulic actuator is approaching the steady state. The driving of the hydraulic actuator can therefore be controlled with higher accuracy than in a case of using the second estimated velocity that is inferior in estimation accuracy to the first estimated velocity. That is, it is possible to perform highly accurate control of the hydraulic actuator while ensuring control stability at a start of movement of the hydraulic actuator.

Problems, configurations, and effects other than those described above will be made apparent by the following description of embodiments.

MODES FOR CARRYING OUT THE INVENTION

Embodiments of a work machine according to the present invention will hereinafter be described with reference to the drawings. In the present embodiments, description will be made by taking a hydraulic excavator as an example of the work machine.

First Embodiment

Figure 1:
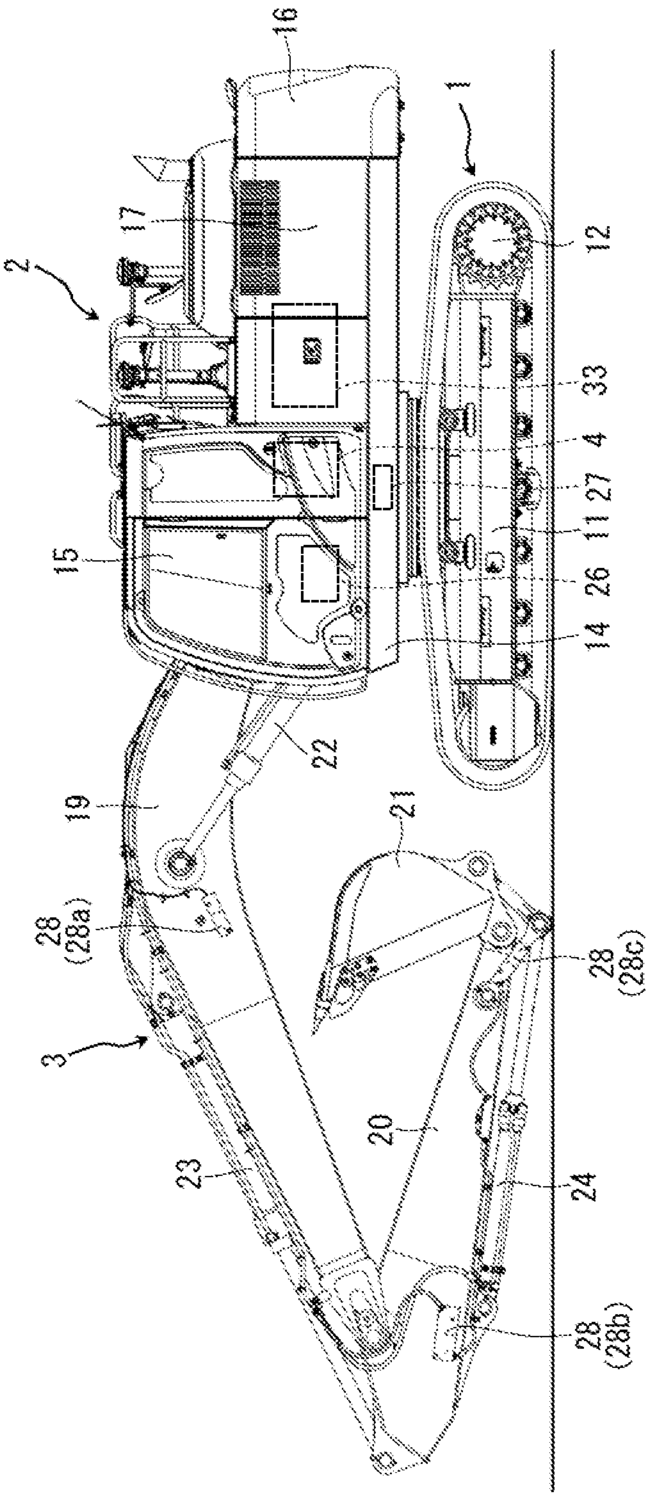
FIG. 1 is an external view showing a hydraulic excavator as a work machine according to a first embodiment of the present invention.

A general configuration of a hydraulic excavator as the work machine according to the first embodiment of the present invention will first be described with reference to FIG. 1. FIG. 1 is an external view showing the hydraulic excavator as the work machine according to the first embodiment of the present invention. In the following, the description will be made using directions as viewed from an operator seated in a cab seat.

In FIG. 1, the hydraulic excavator as a work machine includes: a self-travelable lower track structure 1; an upper swing structure 2 swingably mounted on the lower track structure 1; and a front work device 3 elevatably provided on a front portion of the upper swing structure 2. The upper swing structure 2 is configured to be swing-driven with respect to the lower track structure 1 by a swing device 4 including a swing hydraulic motor as a hydraulic actuator.

Incidentally, the upper swing structure 2 constitutes a machine body of the hydraulic excavator.

The lower track structure 1, for example, has a crawler type track device 11 on both of a left side and a right side (only the left side is shown in FIG. 1). The left and right track devices 11 each perform travelling action with travelling hydraulic motors 12 as hydraulic actuators.

The upper swing structure 2 includes: a swing frame 14 as a supporting structure swingably mounted on the lower track structure 1; a cab 15 installed on a left front side on the swing frame 14; a counterweight 16 provided at a rear end portion of the swing frame 14; and a machine room 17 provided between the cab 15 and the counterweight 16. Arranged within the cab 15 are the cab seat (not shown) in which the operator is seated, an operation device 58 to be described later (see FIG. 2 to be described later), and the like. The counterweight 16 is to achieve a weight balance with the front work device 3. The machine room 17 houses various kinds of apparatuses such as a prime mover (not shown), a hydraulic pump 31 to be described later (see FIG. 2 to be described later), and a control valve unit 33 including a control valve 332 to be described later (see FIG. 2 to be described later).

The front work device 3 is to perform various kinds of work such as excavation work. The front work device 3 is, for example, an articulated work device constituted by joining together a plurality of driven members rotatably in a vertical direction. The plurality of driven members include, for example, a boom 19, an arm 20, and a bucket 21 as a work tool. A proximal end portion of the boom 19 is supported by a front portion of the swing frame 14 of the upper swing structure 2 so as to be rotatable in an upward-downward direction. A proximal end portion of the arm 20 is supported by a distal end portion of the boom 19 so as to be rotatable in the upward-downward direction. A proximal end portion of the bucket 21 is supported by a distal end portion of the arm 20 so as to be rotatable in the upward-downward direction. The boom 19, the arm 20, and the bucket 21 are respectively actuated by the driving of a boom cylinder 22, an arm cylinder 23, and a bucket cylinder 24 as hydraulic actuators.

Installed on the upper swing structure 2 are a first posture sensing device 26 that senses a physical quantity (posture information) related to the posture of the upper swing structure 2 (machine body) and a second posture sensing device 27 that senses a swing velocity and a swing angle of the upper swing structure 2. The first posture sensing device 26 senses, for example, an inclination in a front-rear direction of the upper swing structure 2 (pitch angle) and an inclination in a left-right direction (width direction) of the upper swing structure 2 (roll angle) as the physical quantity related to the posture of the upper swing structure 2 (machine body). The first posture sensing device 26 and the second posture sensing device 27 are constituted by an inertial measurement unit (IMU), for example. The first posture sensing device 26 and the second posture sensing device 27 output sensing signals corresponding to sensing values to a controller 60 to be described later (see FIG. 2 to be described later).

Installed on the front work device 3 is a third posture sensing device 28 that senses a physical quantity related to the posture of the front work device 3 (posture information) and a physical quantity related to a motion state of the front work device 3 (motion information). The third posture sensing device 28 is constituted by a plurality of posture sensors 28_a_, 28_b_, and 28_c_ that respectively sense physical quantities related to the postures of the boom 19, the arm 20, and the bucket 21 as constituent members of the front work device 3 (posture information) and physical quantities related to the motion states of the boom 19, the arm 20, and the bucket 21 (motion information). The posture sensors 28_a_, 28_b_, and 28_c_ are each constituted by an inertia measurement unit (IMU), for example. The third posture sensing device 28 (posture sensors 28_a_, 28_b_, and 28_c_) outputs sensing signals corresponding to sensing values to the controller 60 to be described later (see FIG. 2 to be described later). Incidentally, it suffices for each of the posture sensors 28_a_, 28_b_, and 28_c_ constituting the third posture sensing device 28 to be able to sense the posture information and the motion information of the driven members 19, 20, and 21 of the front work device 3, and the posture sensors 28_a_, 28_b_, and 28_c_ can be each constituted by an inclination sensor, an angle sensor, a stroke sensor, or the like. The posture sensors 28_a_, 28_b_, and 28_c_ of the third posture sensing device 28 each correspond to a "first sensing device that senses motion information of a driven member" described in claims.

Figure 2:
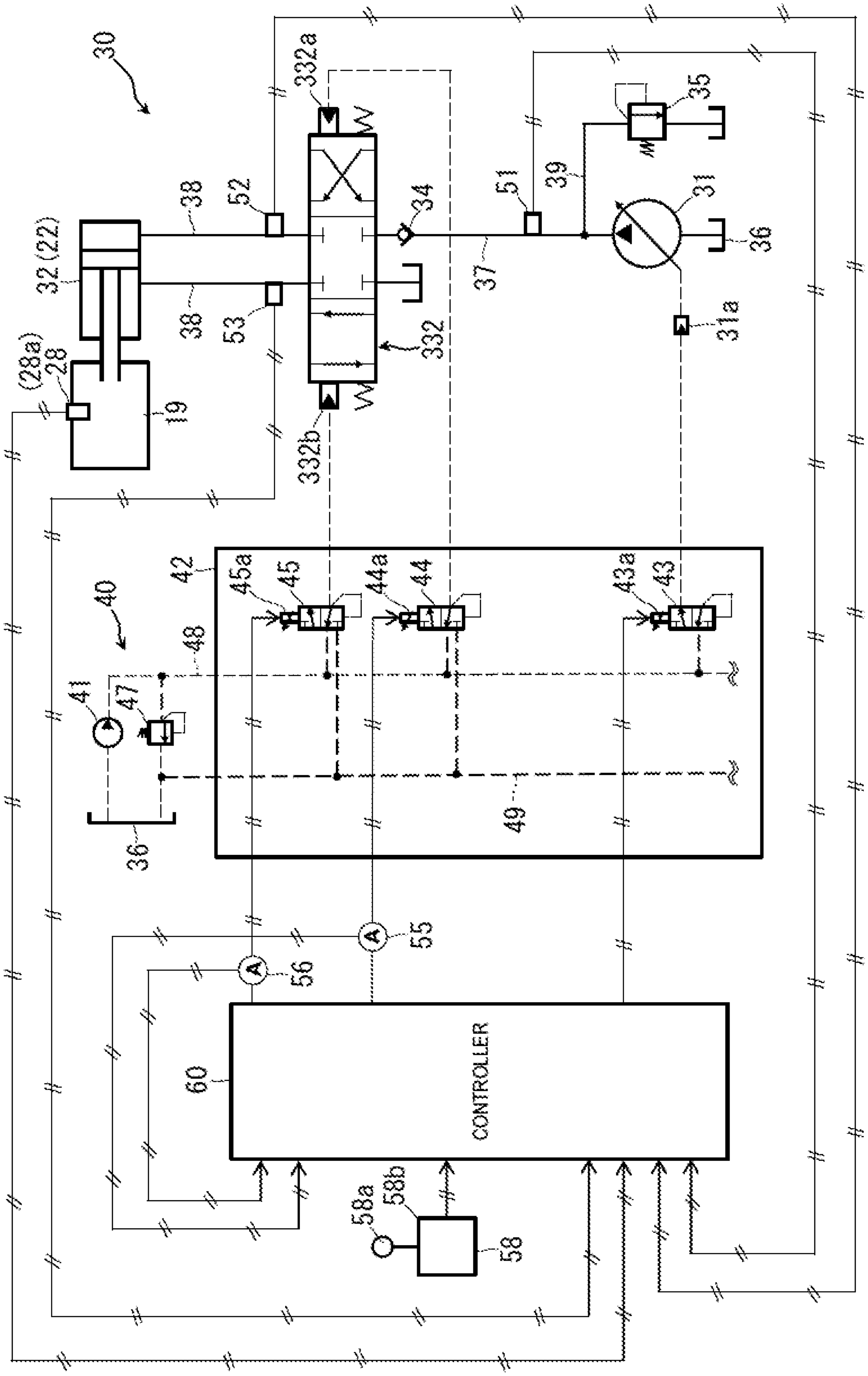
FIG. 2 is a circuit diagram showing a hydraulic system included in the work machine according to the first embodiment of the present invention.

A configuration of a hydraulic system incorporated in the work machine according to the first embodiment of the present invention will next be described with reference to FIG. 2. FIG. 2 is a circuit diagram showing the hydraulic system included in the work machine according to the first embodiment of the present invention.

In FIG. 2, the hydraulic excavator includes a hydraulic system 30 that hydraulically actuates the lower track structure 1, the upper swing structure 2, and the front work device 3 (see FIG. 1 for each). Incidentally, FIG. 2 shows only a hydraulic circuit related to the boom cylinder 22 that actuates the boom 19 of the front work device 3, and does not show other hydraulic circuits related to the travelling hydraulic motors 12 that actuate the track devices 11, the swing hydraulic motor (swing device 4) that swing-actuates the upper swing structure 2, and the arm cylinder 23 and the bucket cylinder 24 that actuate the arm 20 and the bucket 21 of the front work device 3. In addition, those not related to the present invention are omitted, such as a bleed-off valve that discharges a delivery amount of the hydraulic pump 31 into a hydraulic operating fluid tank 36 to be described later during non-operation of an operation device 58 to be described later, and various kinds of apparatuses.

The hydraulic system 30 includes: the hydraulic pump 31 that is driven by a prime mover (not shown) to deliver a hydraulic fluid; a hydraulic actuator 32 (boom cylinder 22) that is driven by the hydraulic fluid supplied from the hydraulic pump 31 to actuate the boom 19; and the directional control valve 332 that controls a flow (direction and flow rate) of the hydraulic fluid to be supplied from the hydraulic pump 31 to the hydraulic actuator 32. The prime mover is, for example, an engine or an electric motor.

The hydraulic pump 31 is, for example, a pump of the variable displacement type. The hydraulic pump 31 has a regulator that regulates a pump displacement. The regulator, for example, regulates the pump displacement according to a command signal of the controller 60. The regulator includes a flow rate command pressure port 31_a_ to which a pilot pressure as a flow rate command signal is input from a pilot hydraulic circuit 40 to be described later.

The directional control valve 332 for the boom cylinder 22 constitutes a part of the control valve unit 33 (see FIG. 1). That is, the control valve unit 33 is an aggregate of directional control valves that control flows (directions and flow rates) of the hydraulic fluid to the respective hydraulic actuators 12, 22, 23, and 24. The directional control valve 332 is of a hydraulic pilot type, for example, and has a pair of command pressure ports 332_a_ and 332_b_ on both sides.

The driving (a switching direction and a stroke amount) of the directional control valve 332 is controlled by inputting pilot secondary pressure generated by the pilot hydraulic circuit 40 to be described later to the pair of command pressure ports 332*a* and 332*b*.

The directional control valve 332 is connected to the delivery side of the hydraulic pump 31 via a pump line 37. The directional control valve 332 is also connected to the hydraulic actuator 32 (boom cylinder 22) via actuator lines 38 and 38.

The pump line 37 is connected to the hydraulic operating fluid tank 36 via a relief line 39 that branches from the pump line 37. A relief valve 35 is disposed on the relief line 39. The relief valve 35 defines an upper limit of a delivery pressure (main hydraulic circuit) of the hydraulic pump 31. The relief valve 35 is configured to be opened when the delivery pressure of the hydraulic pump 31 exceeds a set pressure.

A check valve 34 is disposed on the pump line 37. The check valve 34 is configured to allow a flow of the hydraulic fluid from the hydraulic pump 31 to the directional control valve 332, but obstruct a flow of the hydraulic fluid from the directional control valve 332 to the hydraulic pump 31. That is, the check valve 34 prevents a reverse flow of the hydraulic fluid from the actuator lines 38 and 38 to the pump line 37.

A first pressure sensor 51 that senses the delivery pressure of the hydraulic pump 31 is disposed on the pump line 37. The first pressure sensor 51 outputs a pressure sensing signal Pp corresponding to the sensed delivery pressure of the hydraulic pump 31 to the controller 60.

Second pressure sensors 52 and 53 that sense the pressure of the hydraulic actuator 32 (driving pressure of the boom cylinder 22) are respectively disposed on the actuator lines 38 and 38. The second pressure sensors 52 and 53 output a pressure sensing signal Ps corresponding to the sensed pressure of the hydraulic actuator 32 to the controller 60.

The hydraulic system 30 further includes the pilot hydraulic circuit 40 for controlling the driving (a switching direction and a stroke amount) of each hydraulic pilot type directional control valve constituting the control valve unit 33 and regulating the pump displacement of the hydraulic pump 31. The pilot hydraulic circuit 40 includes: a pilot pump 41 as a pilot hydraulic fluid source; a first solenoid proportional valve 43 that reduces the delivery pressure of the pilot pump 41 (pilot primary pressure) according to a first valve command signal Cp from the controller 60, and thereby generates pilot secondary pressure to be input to the flow rate command pressure port 31*a* of the regulator of the hydraulic pump 31; second solenoid proportional valves 44 and 45 that reduce the delivery pressure of the pilot pump 41 (pilot primary pressure) according to second valve command signals Cv from the controller 60, and thereby generate pilot secondary pressure to be input to the command pressure ports 332*a* and 332*b* of the directional control valve 332. An aggregate of a plurality of solenoid proportional valves including the first solenoid proportional valve 43 and the second solenoid proportional valves 44 and 45 constitutes a solenoid valve unit 42.

The pilot pump 41 generates the pilot primary pressure as an original pressure of the pilot secondary pressure to be input to the regulator of the hydraulic pump 31 and the directional control valve 332. The pilot pump 41 is driven by the prime mover (not shown). The pilot pump 41 is, for example, a pump of the fixed displacement type. The pilot pump 41 is connected to the solenoid valve unit 42 including the first solenoid proportional valve 43 and the second solenoid proportional valves 44 and 45 via a pilot line 48. The pilot line 48 is connected to the hydraulic operating fluid tank 36 via a pilot relief valve 47. The pilot relief valve 47 is configured to be opened when the delivery pressure of the pilot pump 41 (pilot primary pressure) exceeds a set pressure. The pilot relief valve 47 is to maintain the pilot primary pressure at the set pressure.

The output side of the first solenoid proportional valve 43 is connected to the flow rate command pressure port 31*a* of the regulator of the hydraulic pump 31. The output sides of the second solenoid proportional valves 44 and 45 are respectively connected to the command pressure ports 332*a* and 332*b* of the directional control valve 332. The first solenoid proportional valve 43 and the second solenoid proportional valves 44 and 45 are connected to the hydraulic operating fluid tank 36 via a pilot line 49.

A solenoid portion 43*a* of the first solenoid proportional valve 43 is electrically connected to the controller 60. The first valve command signal Cp from the controller 60 is input to the solenoid portion 43*a*. Solenoid portions 44*a* and 45*a* of the second solenoid proportional valves 44 and 45 are electrically connected to the controller 60. The second valve command signals Cv from the controller 60 are input to the solenoid portions 44*a* and 45*a*. Current sensors 55 and 56 are provided which sense currents as the second valve command signals Cv from the controller 60 to the solenoid portions 44*a* and 45*a* of the second solenoid proportional valves 44 and 45.

The operation device 58 that gives instructions for motions of the boom 19 and the like as the driven members of the front work device 3 is electrically connected to the controller 60. The operation device 58 is of an electric type, for example. The operation device 58 outputs an operation signal corresponding to an input operation amount and an input operation direction as an electric signal to the controller 60. The operation device 58 is an operation lever device, for example. The operation device 58 includes an operation lever 58*a* to be gripped by the operator and an electric signal generating unit 58*b* that senses an operation direction and an operation amount of the operation lever 58*a*, and that generates an operation signal corresponding to sensed values as an electric signal.

The controller 60 controls opening degrees of the respective solenoid proportional valves 43, 44, and 45 based on the operation signal (electric signal) from the operation device 58 and sensing signals (sensed values) from the respective sensors 28*a* (28), 51, 52, 53, 55, and 56, and thereby ultimately controls the driving of the hydraulic actuator 32 (boom cylinder 22).

Figure 3:
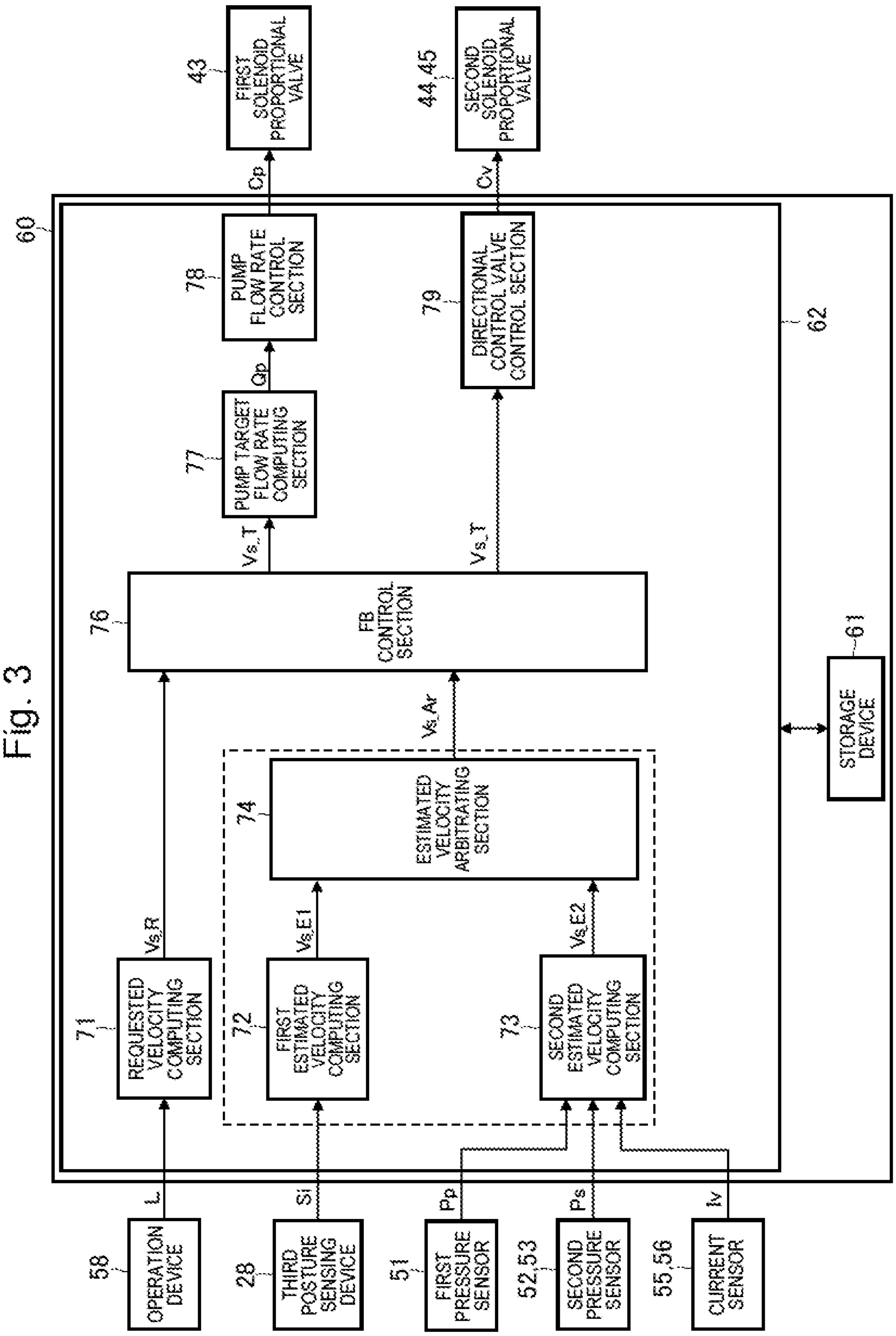
FIG. 3 is a functional block diagram of a controller that controls the hydraulic system in the work machine according to the first embodiment of the present invention which hydraulic system is shown in FIG. 2.

Functions of the controller constituting a part of the work machine according to the first embodiment of the present invention will next be described with reference to FIG. 3. FIG. 3 is a functional block diagram of the controller that controls the hydraulic system in the work machine according to the first embodiment of the present invention which hydraulic system is shown in FIG. 2.

In FIG. 3, the controller 60 includes, as a hardware configuration, for example, a storage device 61 constituted by a RAM, a ROM, and the like and a processor 62 constituted by a CPU, an MPU, or the like. The storage device 61 stores, in advance, programs and various kinds of information necessary to control the pump displacement (pump flow rate) of the hydraulic pump 31 and the driving of the directional control valve 332. The processor 62 implements various kinds of functions by reading the programs and the various kinds of information from the storage device 61 as appropriate, and performing processing according to the programs. A feature of the controller 60 of the present embodiment is, in brief, to perform driving control (velocity control) of each hydraulic actuator, that is, the boom cylinder 22, the arm cylinder 23, and the bucket cylinder 24 by estimating the velocity of each hydraulic actuator by using two kinds of methods, computing an arbitrated velocity as a velocity arbitrated by arbitrating the two estimated velocities according to a driving state of each hydraulic actuator, and performing feedback control based on the arbitrated velocity as a result of the computation. Incidentally, in the following, description will be made of only the driving control (velocity control) of the boom cylinder 22 (hydraulic actuator 32). However, the driving controls (velocity controls) of the arm cylinder 23 and the bucket cylinder 24 are also similar, and therefore description thereof will be omitted. "Arbitration" is synonymous with signal arbitration, and means making adjustment so as to increase one velocity relative to another velocity and decrease the other velocity relative to the one velocity.

The controller 60 includes, as functions performed by the processor 62, a requested velocity computing section 71, a first estimated velocity computing section 72, a second estimated velocity computing section 73, an estimated velocity arbitrating section 74, a feedback control section 76 (that may hereinafter be referred to as an FB control section), a pump target flow rate computing section 77, a pump flow rate control section 78, and a directional control valve control section 79.

The requested velocity computing section 71 captures an operation signal L from the operation device 58, and computes a requested velocity Vs_R of the hydraulic actuator 32 (boom cylinder 22) based on the captured operation signal L. The requested velocity computing section 71 can compute the requested velocity Vs_R by using, for example, a characteristic table in which correspondence relation between the operation amount of the operation device 58 and the velocity of the hydraulic actuator (hydraulic cylinder) is defined in advance. The requested velocity Vs_R as a result of the computation is used for computation of feedback control to be described later by the FB control section 76.

The first estimated velocity computing section 72 captures sensed values Si of the respective posture sensors 28*a*, 28*b*, and 28*c* of the third posture sensing device 28 that senses the posture information and the motion information of the boom 19, the arm 20, and the bucket 21 constituting the front work device 3. The first estimated velocity computing section 72 estimates the driving velocity of the boom cylinder 22 that actuates the boom 19 as a first estimated velocity Vs_E1 based on the captured sensed values Si of the respective posture sensors 28*a*, 28*b*, and 28*c*.

The posture sensors 28*a*, 28*b*, and 28*c* sense actual motion states of the driven members 19, 20, and 21 of the front work device 3. Thus, the first estimated velocity Vs_E1 is a value obtained by directly calculating the driving velocity of each hydraulic actuator from geometric relation between the driven members 19, 20, and 21 and the hydraulic actuators (the boom cylinder 22, the arm cylinder 23, and the bucket cylinder 24) based on the actual motion states of the driven members 19, 20, and 21. Hence, the first estimated velocity Vs_E1 is a value that estimates the actual driving state (driving velocity) of the hydraulic actuator 32 (boom cylinder 22) with high accuracy. On the other hand, the posture sensors 28*a*, 28*b*, and 28*c* output motion information corresponding to a stop state until the driven members 19, 20, and 21 of the front work device 3 actually start to move. Thus, the first estimated velocity Vs_E1 is an estimated value of zero until the driven members 19, 20, and

21 actually start to move. It is therefore not possible to predict motions of the driven members 19, 20, and 21 of the front work device 3 based on the first estimated velocity Vs_E1 estimated from the sensed values of the respective posture sensors 28*a*, 28*b*, and 28*c* and appropriately adjust control commands.

The second estimated velocity computing section 73 captures the sensed value Pp of the first pressure sensor 51 (delivery pressure of the hydraulic pump 31), the sensed values Ps of the second pressure sensors 52 and 53 (pressure of the hydraulic actuator 32), and sensed values Iv of the current sensors 55 and 56 (current values as the second valve command signal to the second solenoid proportional valves 44 and 45), and estimates the driving velocity of each hydraulic actuator 32 as a second estimated velocity Vs_E2 based on the captured sensed values of the respective sensors 51, 52, 53, 55, and 56. A differential pressure across the directional control valve 332 can be estimated from a difference between the delivery pressure of the hydraulic pump 31 (sensed value Pp of the first pressure sensor 51) and the pressure of the hydraulic actuator 32 (sensed values Ps of the second pressure sensors 52 and 53). In addition, the opening degree (opening area) of the directional control valve 332 can be estimated on the basis of the current values to the second solenoid proportional valves 44 and 45. The flow rate of the hydraulic fluid flowing from the directional control valve 332 to the hydraulic actuator 32 can be estimated by using a hydrodynamic relational expression from the differential pressure across the directional control valve 332 and the opening area of the directional control valve 332.

Specifically, the second estimated velocity Vs_E2 is calculated by using the following Equation (1), for example.

[Equation 1]

$$Vs_{\_E2} = C_d \frac{Av}{A_S} \sqrt{\frac{2\Delta P}{\rho}} \qquad \text{Equation (1)}$$

where Cd denotes a flow rate coefficient, Av denotes the opening area of each directional control valve 332, As denotes the pressure receiving area of each hydraulic actuator 32 (boom cylinder 22), ΔP denotes the differential pressure across each directional control valve 332, and ρ denotes the density of hydraulic operating fluid. The flow rate coefficient Cd, the density ρ of the hydraulic operating fluid, and the pressure receiving area As of the hydraulic actuator 32 (boom cylinder 22) are stored in the storage device 61 in advance.

The second estimated velocity Vs_E2 is the driving velocity of the hydraulic actuator 32 (boom cylinder 22) predicted from the flow rate (meter-in flow rate) of the hydraulic fluid supplied from the directional control valve 332 to the hydraulic actuator 32 (boom cylinder 22). That is, the second estimated velocity Vs_E2 is not estimated on the basis of the actual driving state of the hydraulic actuator 32 (boom cylinder 22), but is an estimated value obtained by predicting a possible future driving state of the hydraulic actuator 32 (boom cylinder 22). It is therefore possible to predict motions of the driven members 19, 20, and 21 of the front work device 3 and appropriately adjust control commands based on the second estimated velocity Vs_E2 estimated from the sensed values of the respective sensors 51, 52, 53, 55, and 56 related to the directional control valve 332. However, the second estimated velocity Vs_E2 is an estimated value obtained by using a hydrodynamic relational equation, and thus tends to invite a decrease in estimation accuracy due to effects of disturbances such as oil temperature and cavitation and the sensing accuracy of the sensors. The second estimated velocity Vs_E2 therefore tends to be inferior in estimation accuracy to the first estimated velocity Vs_E1.

Incidentally, in the present embodiment, the first pressure sensor 51, the second pressure sensors 52 and 53, and the current sensors 55 and 56 constitute a sensing device that senses information related to the flow rate of the hydraulic fluid supplied to the hydraulic actuator 32 via the directional control valve 332. When the sensing device is subdivided, the first pressure sensor 51 and the second pressure sensors 52 and 53 constitute a sensor that senses a physical quantity related to the differential pressure across the directional control valve 332. In addition, the current sensors 55 and 56 constitute a sensor that senses a physical quantity related to the opening area of the directional control valve 332.

The estimated velocity arbitrating section 74 computes an arbitrated velocity Vs_Ar of the hydraulic actuator 32 (boom cylinder 22) by using the first estimated velocity Vs_E1 of the hydraulic actuator 32 (boom cylinder 22) as a computation result of the first estimated velocity computing section 72 and the second estimated velocity Vs_E2 of the hydraulic actuator 32 (boom cylinder 22) as a computation result of the second estimated velocity computing section 73. The estimated velocity arbitrating section 74 computes the arbitrated velocity Vs_Ar by arbitrating the first estimated velocity Vs_E1 and the second estimated velocity Vs_E2 according to the driving state of the hydraulic actuator 32 in consideration of characteristics of the first estimated velocity Vs_E1 described above and characteristics of the second estimated velocity Vs_E2 described above.

In brief, when the hydraulic actuator 32 (boom cylinder 22) starts to move, an arbitration is performed such that a weighting for the second estimated velocity Vs_E2 is larger than a weighting for the first estimated velocity Vs_E1 in order to suppress control instability (hunting or the like) caused by an effect of a response delay of the hydraulic actuator 32 due to the inertia of the front work device 3 (boom 19). Here, "weighting" is synonymous with a degree of effect or priority. In addition, when the driving state of the hydraulic actuator 32 (boom cylinder 22) has made a transition from a state of starting to move and is approaching a steady state past a predetermined state, an arbitration is performed so as to increase the weighting for the first estimated velocity Vs_E1 and relatively decrease the weighting for the second estimated velocity Vs_E2 in order to enhance accuracy of the estimated velocity of the hydraulic actuator 32. Such an arbitration is performed to thereby compute the estimated velocity (arbitrated velocity Vs_Ar) of the hydraulic actuator 32 appropriate for feedback control according to the driving state of the hydraulic actuator 32 when the hydraulic actuator 32 starts to move or the hydraulic actuator 32 approaches the steady state from the predetermined state.

Specifically, the arbitrated velocity Vs_Ar is calculated by using the following Equations (2) to (4), for example. Here, Vs_E1 is the first estimated velocity, Vs_E2 is the second estimated velocity, and Vs_R is the requested velocity.

[Equation 2]

$$Vs_{\_Ar} = \alpha\beta \times Vs_{\_E2} + (1-\alpha\beta) \times Vs_{\_E1} \quad \text{Equation (2)}$$

-continued

[Equation 3]

$$\alpha = \frac{|Vs_{\_E2} - Vs_{\_E1}|}{Vs_{\_E2}} \quad \text{Equation (3)}$$

[Equation 4]

$$\beta = \frac{|Vs_{\_R} - Vs_{\_E1}|}{Vs_{\_R}} \quad \text{Equation (4)}$$

α derived from Equation (3) and β derived from Equation (4) are weights at arbitrating the first estimated velocity Vs_E1 and the second estimated velocity Vs_E2. The coefficient α is basically a weight that reflects whether or not the driving state of the hydraulic actuator 32 (boom cylinder 22) is a state of starting to move. That is, the coefficient α functions as an index that makes it possible to determine whether or not the hydraulic actuator 32 is in a state of starting to move. In addition, the coefficient α also serves as a weight that reflects a state in which the driving state of the hydraulic actuator 32 (boom cylinder 22) has made a transition from a state of starting to move, and is approaching the steady state past the predetermined state. That is, the coefficient α also functions as an index that makes it possible to determine whether or not the hydraulic actuator 32 is approaching the steady state past the predetermined state. On the other hand, the coefficient β is a weight that reflects whether or not the driving state of the hydraulic actuator 32 (boom cylinder 22) is approaching the steady state past the predetermined state more reliably than the coefficient α. That is, the coefficient β functions as an index that makes it possible to determine more reliably whether or not the hydraulic actuator 32 is approaching the steady state past the predetermined state.

In the computation of α in Equation (3), a large degree of deviation of the first estimated velocity Vs_E1 with respect to the second estimated velocity Vs_E2 means that the actual driving state of the hydraulic actuator 32 (boom cylinder 22) deviates with respect to the driving state of the hydraulic actuator 32 predicted on the basis of the flow rate of the hydraulic fluid supplied to the hydraulic actuator 32 via the directional control valve 332. It is generally assumed that this state is a state in which the hydraulic actuator 32 (boom cylinder 22) starts to move. In this case, the weight α for the second estimated velocity Vs_E2 is increased whereas the weight for the first estimated velocity Vs_E1 is relatively decreased.

Conversely, in the computation of α in Equation (3), a very small degree of deviation of the first estimated velocity Vs_E1 with respect to the second estimated velocity Vs_E2 means that the actual driving state of the hydraulic actuator 32 (boom cylinder 22) and the driving state of the hydraulic actuator 32 predicted from the passing flow rate of the directional control valve 332 are close to each other. In this state, it is generally assumed that a driving state is continued in which the hydraulic actuator 32 (boom cylinder 22) is approaching the steady state past the predetermined state. In this case, the weight α for the second estimated velocity Vs_E2 is decreased whereas the weight for the first estimated velocity Vs_E1 is relatively increased.

However, even a very small degree of deviation (coefficient α) of the first estimated velocity Vs_E1 with respect to the second estimated velocity Vs_E2 does not necessarily means that the first estimated velocity Vs_E1 has reached the vicinity of the requested velocity Vs_R. Accordingly, the arbitration of the first estimated velocity Vs_E1 and the second estimated velocity Vs_E2 is performed by further using the coefficient β. In the computation of β in Equation (4), a very small degree of deviation of the first estimated velocity Vs_E1 with respect to the requested velocity Vs_R means that the actual driving state of the hydraulic actuator 32 (boom cylinder 22) is close to the requested velocity Vs_R corresponding to the operation of the operation device 58. This state occurs when the actual driving state of the hydraulic actuator 32 (boom cylinder 22) appropriately follows a control target value. In this case, the weight β for the second estimated velocity Vs_E2 is decreased whereas the weight for the first estimated velocity Vs_E1 is relatively increased. When the weight for the first estimated velocity Vs_E1 that is more accurate than the second estimated velocity Vs_E2 is increased, the velocity of the hydraulic actuator 32 with the driving state close to the steady state can be estimated with high accuracy.

Conversely, in the computation of β in Equation (4), a large degree of deviation of the first estimated velocity Vs_E1 with respect to the requested velocity Vs_R means that the actual driving state of the hydraulic actuator 32 (boom cylinder 22) deviates from the requested velocity Vs_R corresponding to the operation. If feedback control is performed by using the first estimated velocity Vs_E1, there is a fear that a correction amount of the feedback control may become excessive and the jumping out or hunting of the hydraulic actuator 32 may occur. Accordingly, in such a case, the weight β for the second estimated velocity Vs_E2 is increased whereas the weight for the first estimated velocity Vs_E1 is relatively decreased.

The FB control section 76 computes, based on the requested velocity Vs_R of the hydraulic actuator 32 as a computation result of the requested velocity computing section 71 and the arbitrated velocity Vs_Ar of the hydraulic actuator 32 as a computation result of the estimated velocity arbitrating section 74, a target velocity Vs_T of the hydraulic actuator 32 for correcting control commands so as to reduce a velocity deviation between the requested velocity Vs_R and the arbitrated velocity Vs_Ar. The target velocity Vs_T is, for example, computed on the basis of the velocity deviation between the requested velocity Vs_R and the arbitrated velocity Vs_Ar by using a computing method of PID control.

The pump target flow rate computing section 77 computes a pump target flow rate Qp of the hydraulic pump 31 based on the target velocity Vs_T of the hydraulic actuator 32 as a computation result of the FB control section 76. The computation of the pump target flow rate Qp uses also design specifications of the hydraulic actuator 32 stored in the storage device 61 in advance.

The pump flow rate control section 78 computes a first valve command signal Cp for the first solenoid proportional valve 43 which first valve command signal Cp corresponds to the pump target flow rate Qp as a computation result of the pump target flow rate computing section 77. The pump flow rate control section 78 can compute the first valve command signal Cp by using, for example, a characteristic table in which correspondence relation between the pump target flow rate Qp and the first valve command signal Cp for the first solenoid proportional valve 43 is defined in advance. The pump flow rate control section 78 outputs the first valve command signal Cp to the first solenoid proportional valve 43.

The directional control valve control section 79 computes second valve command signals Cv for the second solenoid proportional valves 44 and 45 which second valve command signals Cv correspond to the target velocity Vs_T of the hydraulic actuator 32 as a computation result of the FB control section 76. The directional control valve control section 79 can compute the second valve command signals Cv by using, for example, a characteristic table in which correspondence relation between the target velocity Vs_T and the second valve command signals Cv for the second solenoid proportional valves 44 and 45 is defined in advance. The directional control valve control section 79 outputs the second valve command signals Cv to the second solenoid proportional valves 44 and 45.

Figure 4:
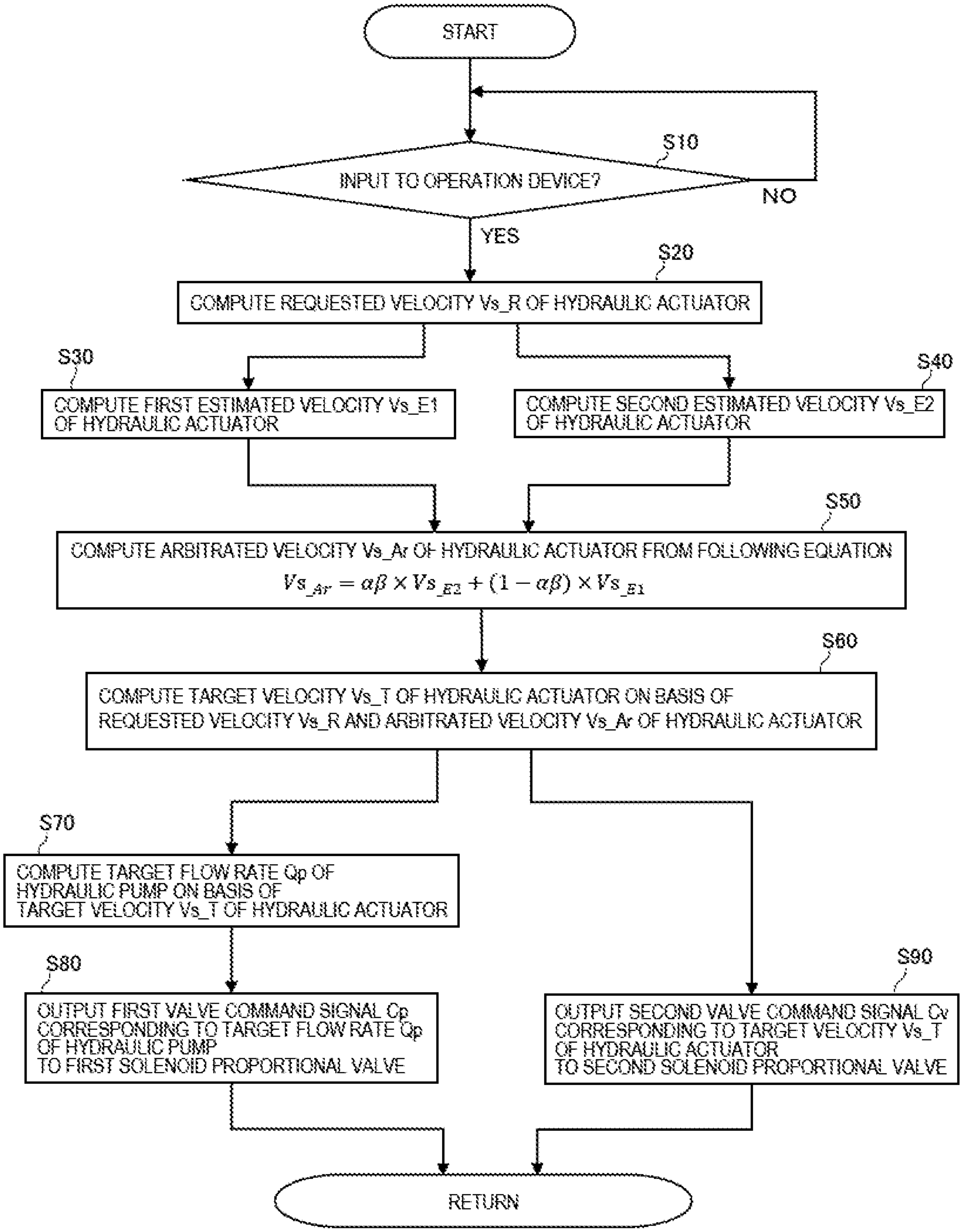
FIG. 4 is a flowchart illustrating an example of a control procedure for the controller in the work machine according to the first embodiment of the present invention which controller is shown in FIG. 3.

An example of a control procedure performed by the controller in the work machine according to the first embodiment of the present invention will next be described with reference to FIG. 4. FIG. 4 is a flowchart illustrating an example of the control procedure for the controller in the work machine according to the first embodiment of the present invention which controller is shown in FIG. 3.

In FIG. 4, the controller 60 shown in FIG. 3 first determines the presence or absence of an operation input to the operation device 58 (input of an operation signal from the operation device 58) (step S10). When there is an operation input to the operation device 58, that is, when an operation signal is input (in a case of YES), the procedure proceeds to step S20. When there is no input of an operation signal (in a case of NO), on the other hand, the procedure returns to step S10, and repeats step S10 until YES is obtained.

In the case of YES in step S10, the requested velocity computing section 71 of the controller 60 computes the requested velocity Vs_R of each hydraulic actuator 32 based on the operation signal L (operation input amount) from the operation device 58 (step S20). The requested velocity computing section 71 computes the requested velocity Vs_R by using, for example, a characteristic table in which correspondence relation between the operation input amount and the velocity of the hydraulic actuator is defined in advance.

Next, the first estimated velocity computing section 72 of the controller 60 computes the driving velocity of each hydraulic actuator 32 as the first estimated velocity Vs_E1 based on the sensed values Si of the posture sensors 28*a*, 28*b*, and 28*c* of the third posture sensing device 28 (the posture information and the motion information of the driven members 19, 20, and 21 of the front work device 3) (step S30). The first estimated velocity Vs_E1 is a value obtained by directly estimating the driving velocities of the driven members 19, 20, and 21 from geometric relation between the driven members 19, 20, and 21 based on the actual motion information of the driven members 19, 20, and 21 of the front work device 3.

At the same time, the second estimated velocity computing section 73 of the controller 60 computes the driving velocity of each hydraulic actuator 32 as the second estimated velocity Vs_E2 based on the delivery pressure of the hydraulic pump 31 as the sensed value Pp of the first pressure sensor 51, the pressure of the hydraulic actuator 32 as the sensed values Ps of the second pressure sensors 52 and 53, and current values as the second valve command signals Cv to the second solenoid proportional valves 44 and 45 as the sensed values Iv of the current sensors 55 and 56 (step S40). The second estimated velocity computing section 73 computes the second estimated velocity Vs_E2 by using, for example, the above-described Equation (1) as a hydrodynamic relational equation. The second estimated velocity Vs_E2 is an estimated value of the driving velocity of each hydraulic actuator 32 predicted to occur hereafter, based on the flow rate of the hydraulic fluid supplied to the hydraulic actuator 32 via the directional control valve 332.

Next, the estimated velocity arbitrating section 74 of the controller 60 computes the arbitrated velocity Vs_Ar of each hydraulic actuator 32 by using the first estimated velocity Vs_E1 as a computation result of the first estimated velocity computing section 72 and the second estimated velocity Vs_E2 as a computation result of the second estimated velocity computing section 73 (step S50). The estimated velocity arbitrating section 74 computes the arbitrated velocity Vs_Ar obtained by arbitrating the first estimated velocity Vs_E1 and the second estimated velocity Vs_E2 according to the driving state of each hydraulic actuator 32, by using the above-described Equations (2) to (4), for example.

When the degree of deviation of the first estimated velocity Vs_E1 with respect to the second estimated velocity Vs_E2 is large, the weight α for the second estimated velocity Vs_E2 is increased whereas the weight for the first estimated velocity Vs_E1 is relatively decreased. Conversely, when the degree of deviation of the first estimated velocity Vs_E1 with respect to the second estimated velocity Vs_E2 is very small, the weight α for the second estimated velocity Vs_E2 is decreased whereas the weight for the first estimated velocity Vs_E1 is relatively increased.

In addition, when the degree of deviation of the first estimated velocity Vs_E1 with respect to the requested velocity Vs_R is very small, the weight β for the second estimated velocity Vs_E2 is decreased whereas the weight for the first estimated velocity Vs_E1 is relatively increased. Conversely, when the degree of deviation of the first estimated velocity Vs_E1 with respect to the requested velocity Vs_R is large, the weight β for the second estimated velocity Vs_E2 is increased whereas the weight for the first estimated velocity Vs_E1 is relatively decreased.

Next, the FB control section 76 of the controller 60 computes the target velocity Vs_T of the hydraulic actuator 32 based on the requested velocity Vs_R as a computation result of the requested velocity computing section 71 and the arbitrated velocity Vs_Ar as a computation result of the estimated velocity arbitrating section 74 (step S60). The target velocity Vs_T is, for example, a target value (control amount) for correcting control commands so as to reduce the velocity deviation between the requested velocity Vs_R and the arbitrated velocity Vs_Ar.

Next, the pump target flow rate computing section 77 of the controller 60 computes the pump target flow rate Qp of the hydraulic pump 31 based on the target velocity Vs_T of each hydraulic actuator 32 as a computation result of the FB control section 76 (step S70). Further, the pump flow rate control section 78 of the controller 60 calculates the first valve command signal Cp for the first solenoid proportional valve 43 which first valve command signal corresponds to the pump target flow rate Qp of the hydraulic pump 31 as a computation result of the pump target flow rate computing section 77. The pump flow rate control section 78 outputs the first valve command signal Cp to the first solenoid proportional valve 43 (step S80).

Thus, the first solenoid proportional valve 43 shown in FIG. 2 generates pilot secondary pressure corresponding to the first valve command signal Cp from pilot primary pressure as the delivery pressure of the pilot pump 41. The pilot secondary pressure generated by the first solenoid proportional valve 43 is input to the fluid pressure port 31*a* of the regulator of the hydraulic pump 31. The pump flow rate (pump displacement) of the hydraulic pump 31 is thereby regulated to be the pump target flow rate Qp as a computation result of the controller 60.

In addition, the directional control valve control section 79 of the controller 60 calculates the second valve command signals Cv for the second solenoid proportional valves 44 and 45 which second valve command signals correspond to the target velocity Vs_T of each hydraulic actuator 32 as a computation result of the FB control section 76. The directional control valve control section 79 outputs the second valve command signals Cv to the second solenoid proportional valves 44 and 45 (step S90). Thus, the second solenoid proportional valves 44 and 45 shown in FIG. 2 generate pilot secondary pressure corresponding to the second valve command signals Cv from the pilot primary pressure as the delivery pressure of the pilot pump 41. The pilot secondary pressures generated by the second solenoid proportional valves 44 and 45 are input to the command pressure ports 332*a* and 332*b* of the directional control valve 332. The opening area (opening degree) of the directional control valve 332 is thereby controlled. Consequently, the flow rate of the hydraulic fluid supplied to the hydraulic actuator 32 via the directional control valve 332 (meter-in flow rate) is controlled to attain the target velocity Vs_T of the hydraulic actuator 32 as a computation result of the controller 60.

When the controller 60 ends the output of the first valve command signal Cp to the first solenoid proportional valve 43 (step S80) and the output of the second valve command signals Cv to the second solenoid proportional valves 44 and 45 (step S90), the controller 60 makes a return, and starts a new control cycle. That is, the controller 60 performs the control cycle including steps S10 to S90 shown in FIG. 4 again, and repeats this.

Figure 5:
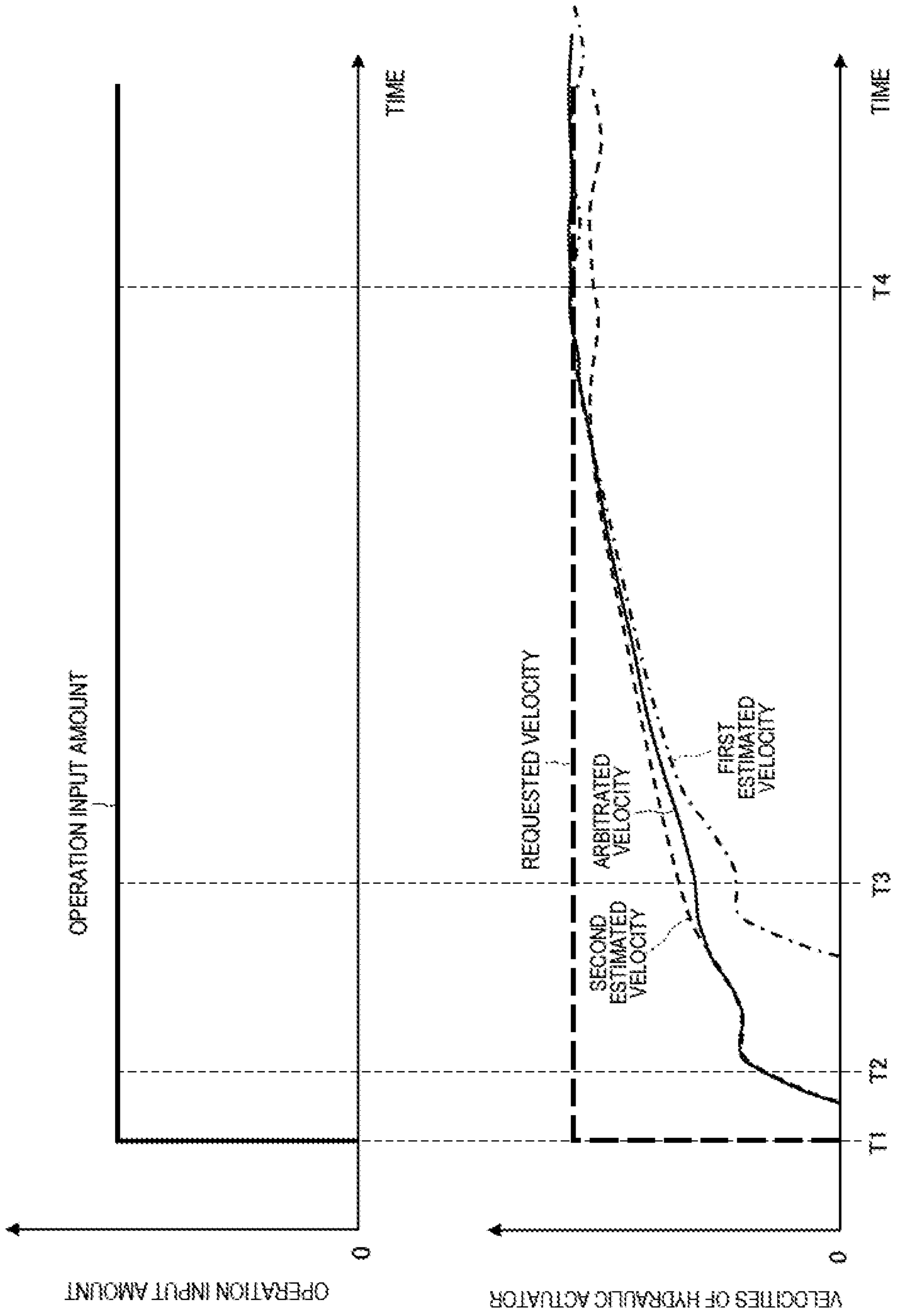
FIG. 5 is a diagram showing an example of temporal changes in computation results of various kinds of estimated velocities of a hydraulic actuator by the controller with respect to input to an operation device in the work machine according to the first embodiment of the present invention.

Motions and effects of the work machine according to the first embodiment of the present invention will next be described. In the following, in order to simplify the description, an operation of the hydraulic system in a case where a single operation of the boom is performed will be described with reference to FIG. 2 and FIG. 5. FIG. 5 is a diagram showing an example of temporal changes in results of computation of various kinds of estimated velocities of the hydraulic actuator by the controller with respect to input to the operation device in the work machine according to the first embodiment of the present invention. In FIG. 5, an upper diagram shows temporal changes in an example of an operation input amount to the operation device, and a lower diagram shows an example of temporal changes in various kinds of velocities of the boom cylinder as computation results of the controller with respect to the operation input amount shown in the upper diagram.

At time T1 shown in FIG. 5, a stepped operation input (solid line in the upper diagram of FIG. 5) is started to the operation device 58 shown in FIG. 2. Thus, the controller 60 shown in FIG. 3 computes the requested velocity Vs_R of the boom cylinder 22 corresponding to the operation input amount L from the operation device 58 (long-dash broken line in the lower diagram of FIG. 5). The controller 60 outputs command signals to the hydraulic pump 31 and the directional control valve 332 based on the requested velocity Vs_R.

At time T2 after the passage of a very short time from the operation input start time T1, the directional control valve 332 shown in FIG. 2 is opened according to the command signals from the controller 60 (second valve command signals Cv to the second solenoid proportional valves 44 and 45). The hydraulic fluid is thereby supplied from the hydraulic pump 31 to the hydraulic actuator 32 (boom cylinder 22) via the directional control valve 332. Thus, the second estimated velocity Vs_E2 computed by the controller 60 on the basis of the sensed value Pp of the first pressure sensor 51 and the sensed values Ps of the second pressure sensors 52 and 53 (differential pressure across the directional control valve 332) and the sensed values Iv of the current sensors 55 and 56 (opening area of the directional control valve 332) is a value that is not 0.

Meanwhile, the boom cylinder 22 makes a driving force act on the boom 19 in a stop state which boom has a large mass, but the boom 19 remains in the stop state due to inertia or the like. Thus, the posture sensor 28*a* of the third posture sensing device 28 senses the driving state of the boom cylinder 22 as the stop state. Therefore, the first estimated velocity Vs_E1 computed by the controller 60 on the basis of the sensed values Si of the third posture sensing device 28 is 0 (zero). As a result, the arbitrated velocity Vs_Ar computed by the controller 60 on the basis of the first estimated velocity Vs_E1 and the second estimated velocity Vs_E2 is the same value as the second estimated velocity Vs_E2. That is, in a state before the boom cylinder 22 actually starts to move, because the posture sensor 28*a* of the third posture sensing device 28 senses the stop state of the boom cylinder 22, an arbitration is performed such that the weights $\alpha$ and $\beta$ for the second estimated velocity Vs_E2 which weights are shown in the above-described Equations (2) to (4) are 1 while the weight for the first estimated velocity Vs_E1 is 0.

At time T3 after the passage of a certain time from time T2, the boom 19 has made a transition to a state of being in motion actually. That is, the posture sensor 28*a* of the third posture sensing device 28 senses an actual driving of the boom cylinder 22. Therefore, the first estimated velocity Vs_E1 is a value corresponding to the sensed values Si of the third posture sensing device 28. On the other hand, as in the case of time T2, the second estimated velocity Vs_E2 is a value corresponding to the sensed value Pp of the first pressure sensor 51 and the sensed values Ps of the second pressure sensors 52 and 53 (differential pressure across the directional control valve 332) and the sensed values Iv of the current sensors 55 and 56 (opening area of the directional control valve 332).

In this case, the arbitrated velocity Vs_Ar is a value obtained by arbitrating the first estimated velocity Vs_E1 and the second estimated velocity Vs_E2 according to the weights $\alpha$ and $\beta$ shown in the above-described Equations (2) to (4). In a case immediately after a start of movement of the boom cylinder 22 as at time T3, there is a large deviation between the second estimated velocity Vs_E2 and the first estimated velocity Vs_E1. Therefore, the arbitrated velocity Vs_Ar is calculated which is arbitrated so as to increase the weight $\alpha$ for the second estimated velocity Vs_E2 and relatively decrease the weight for the first estimated velocity Vs_E1.

At time T4 after the passage of a considerable time from the operation input start time T1, the first estimated velocity Vs_E1 computed on the basis of the sensed values Si of the third posture sensing device 28 is a value close to the requested velocity Vs_R corresponding to the operation input amount. That is, the boom cylinder 22 is in a driving state very close to the steady state. In this case, the degree of deviation of the first estimated velocity Vs_E1 with respect to the requested velocity Vs_R is very small, so that while the weight $\beta$ for the second estimated velocity Vs_E2 is decreased, the weight for the first estimated velocity Vs_E1 is relatively increased. Hence, the arbitrated velocity Vs_Ar is arbitrated such that the component of the first estimated velocity Vs_E1 constitutes most of the arbitrated velocity Vs_Ar and such that the arbitrated velocity Vs_Ar hardly includes the component of the second estimated velocity Vs_E2.

In this way, in the present embodiment, when the boom cylinder 22 starts to move immediately after an operation input is started to the operation device 58, the driving control of the boom cylinder 22 is performed mainly using the second estimated velocity Vs_E2 of the boom cylinder 22 predicted on the basis of the flow rate of the hydraulic fluid supplied to the boom cylinder 22 via the directional control valve 332. Immediately after the start of the operation input, there is a large effect of a response delay of the boom cylinder 22 due to the inertia of the boom 19. Hence, the use of the second estimated velocity Vs_E2 can suppress a deviation with respect to the requested velocity Vs_R corresponding to the operation input more than in a case of using the first estimated velocity Vs_E1 of the boom cylinder 22 computed on the basis of the actual driving state (substantially the stop state) of the boom cylinder 22. It is therefore possible to suppress occurrence of the jumping out or hunting of the boom cylinder 22 due to an excessive correction amount of the feedback control.

On the other hand, when the actual driving state of the boom cylinder 22 is close to a state corresponding to the operation input, the driving control of the boom cylinder 22 is performed mainly using the first estimated velocity Vs_E1 of the boom cylinder 22 computed on the basis of the sensed value of the posture sensor 28*a* that senses the actual driving state of the boom cylinder 22. The first estimated velocity Vs_E1 is an estimate of the driving velocity of the boom cylinder 22 based on the actual driving state of the boom cylinder 22, and can therefore be obtained as a highly accurate estimated value. On the other hand, the second estimated velocity Vs_E2 is an estimate of the driving velocity of the boom cylinder 22 via the hydrodynamic relational equation, and therefore tends to be inferior in estimation accuracy to the first estimated velocity Vs_E1. Hence, when the boom cylinder 22 is in a state close to a driving state corresponding to the operation of the operation device 58, the control of the boom cylinder 22 is performed mainly using the first estimated velocity Vs_E1 which is a more accurate estimated value than the second estimated velocity Vs_E2. This allows a highly accurate velocity control of the boom cylinder 22 to be achieved.

Hence, in the present embodiment, excellent accuracy in the control of the hydraulic actuator 32 can be achieved until the driving state of the boom cylinder 22 (hydraulic actuator 32) changes to a steady state from a state of starting to move.

In addition, in the present embodiment, the arbitrated velocity Vs_Ar of the hydraulic actuator 32 is computed by relatively increasing or decreasing the weighting for the first estimated velocity Vs_E1 and the weighting for the second estimated velocity Vs_E2 according to the driving state of the hydraulic actuator 32 (transition to a steady state from a state of starting to move). Therefore, the arbitrated velocity Vs_Ar does not instantaneously be switched between the values of the first estimated velocity Vs_E1 and the second estimated velocity Vs_E2, so that computation results showing continuous variation can be obtained. Hence, the control based on the arbitrated velocity Vs_Ar can ensure control stability.

Motions of the hydraulic excavator in which the actions and effects of the present embodiment are exerted include, for example, a soil loading motion after excavation. A case is assumed in which a soil excavated by the bucket 21 is swung, lifted by boom raising, and then loaded onto a dump truck. The operator of the hydraulic excavator is expected to input a large operation amount with a quick rise after the excavation in order to shorten a work time (see the upper diagram of FIG. 5). In this case, a moment (time) when the first estimated velocity Vs_E1 of the boom cylinder 22 rises is later than a moment (time) when the second estimated velocity Vs_E2 rises. That is, a time region in which the first estimated velocity Vs_E1 is 0 (zero), such as time T2 in the lower diagram of FIG. 5, is lengthened. In addition, because the requested velocity Vs_R is increased according to a larger operation amount, a time region until the actual velocity of the boom cylinder 22 approaches the requested velocity Vs_R (time region from the vicinity of time T3 to time T4 in the lower diagram of FIG. 5) is also lengthened. Hence, the actions and effects of the present embodiment are considered to be greatly exerted in the soil loading motion after the excavation of the hydraulic excavator.

In the hydraulic excavator (work machine) according to the foregoing first embodiment of the present invention, the computation of the arbitrated velocity Vs_Ar by the controller 60 is to perform an arbitration so as to increase the weight for the second estimated velocity Vs_E2 and relatively decrease the weight for the first estimated velocity Vs_E1 as the degree $\alpha$ of deviation of the first estimated velocity Vs_E1 with respect to the second estimated velocity Vs_E2 is increased.

According to this configuration, when the hydraulic actuator 32 starts to move, an arbitration is performed which makes the weighting for the second estimated velocity Vs_E2 larger than the weighting for the first estimated velocity Vs_E1. Thus, the driving of the hydraulic actuator 32 is controlled using the arbitrated velocity Vs_Ar that includes, as a main component thereof, the second estimated velocity Vs_E2 predicting a future driving state of the hydraulic actuator 32. It is therefore possible to suppress control instability (hunting or the like) caused by an effect of a response delay of the hydraulic actuator 32 due to the inertia of the front work device 3. In addition, when the driving state of the hydraulic actuator 32 is approaching a steady state past a predetermined state, an arbitration is performed so as to increase the weighting for the first estimated velocity Vs_E1 and relatively decrease the weighting for the second estimated velocity Vs_E2. Thus, the driving of the hydraulic actuator 32 is controlled using the arbitrated velocity that includes, as a main component thereof, the first estimated velocity Vs_E1 derived on the basis of the actual driving state of the hydraulic actuator 32. The driving of the hydraulic actuator 32 can therefore be controlled with higher accuracy than in a case of using the second estimated velocity Vs_E2 that is inferior in estimation accuracy to the first estimated velocity Vs_E1. That is, it is possible to perform highly accurate control of the hydraulic actuator 32 while ensuring control stability at a start of movement of the hydraulic actuator 32. In addition, an arbitration is performed so as to relatively change the weighting for the first estimated velocity Vs_E1 and the weighting for the second estimated velocity Vs_E2 according to an increase or a decrease in the deviation degree $\alpha$, and thus the arbitrated velocity Vs_Ar varies continuously. It is therefore possible to ensure the stability of control using the arbitrated velocity Vs_Ar.

In addition, in the present embodiment, the computation of the arbitrated velocity Vs_Ar by the controller 60 is to perform an arbitration so as to increase the weight for the first estimated velocity Vs_E1 and relatively decrease the weight for the second estimated velocity Vs_E2 as the degree $\beta$ of deviation of the first estimated velocity Vs_E1 with respect to the requested velocity Vs_R is decreased.

According to this configuration, when the driving state of the hydraulic actuator 32 is approaching the steady state past the predetermined stat, an arbitration is performed so as to decrease the weight $\beta$ for the second estimated velocity Vs_E2 and relatively increase the weight for the first estimated velocity Vs_E1. Thus, the driving of the hydraulic actuator 32 is controlled using the arbitrated velocity that includes, as a main component thereof, the first estimated velocity Vs_E1 derived on the basis of the actual driving state of the hydraulic actuator 32. The driving of the hydraulic actuator 32 can therefore be controlled with higher accuracy than in a case of using the second estimated velocity Vs_E2 that is inferior in estimation accuracy to the first estimated velocity Vs_E1. In addition, the weight $\beta$ indicates the degree of deviation of the first estimated velocity Vs_E1 with respect to the requested velocity Vs_R, and is therefore an index that reliably reflects whether or not the driving state of the hydraulic actuator 32 is approaching the steady state past the predetermined state.

Second Embodiment

Figure 6:
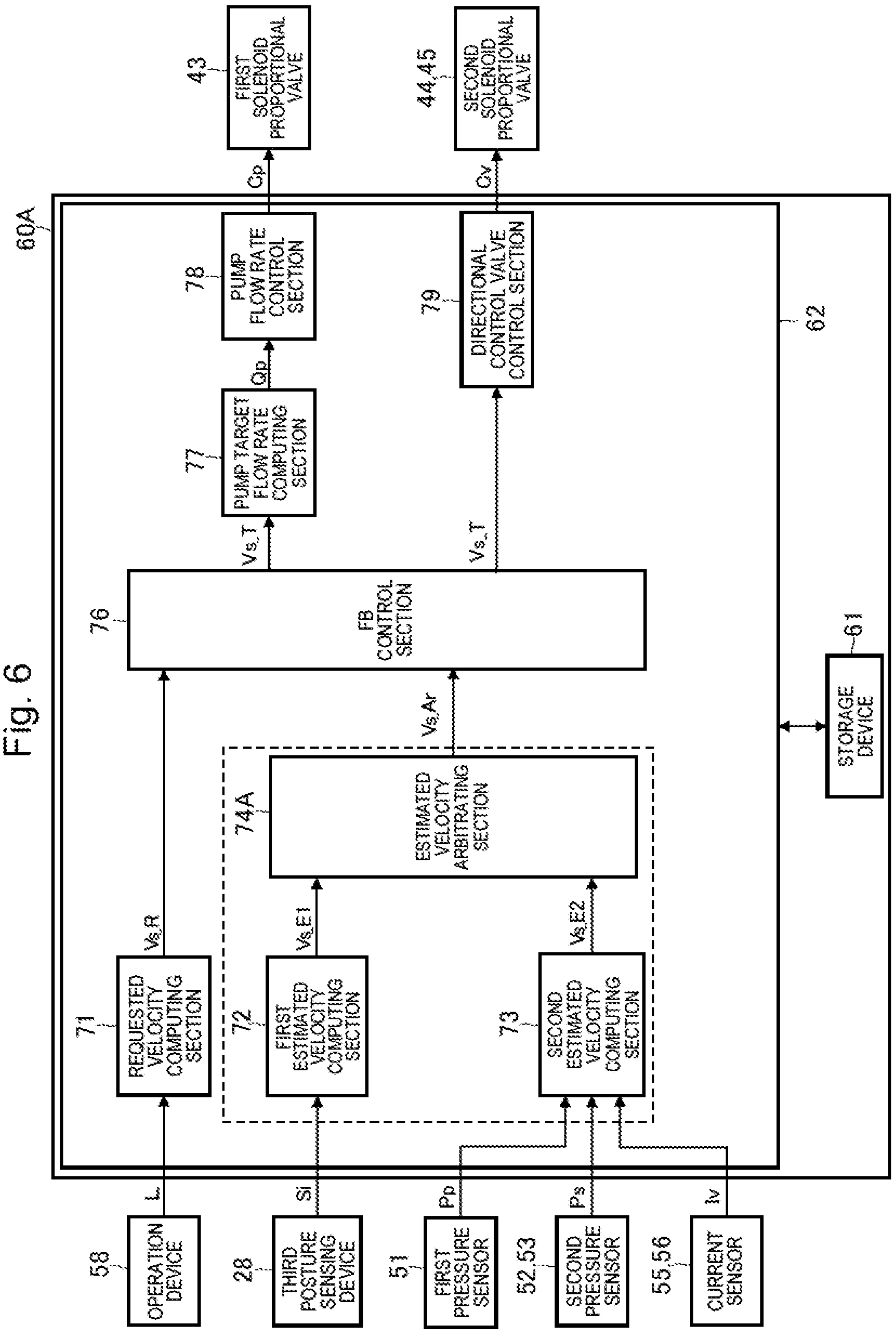
FIG. 6 is a functional block diagram of a controller constituting the work machine according to a second embodiment of the present invention.

A work machine according to a second embodiment of the present invention will next be described with reference to FIGS. 6 to 8. Incidentally, in FIGS. 6 to 8, the same reference numerals as the reference numerals shown in FIGS. 1 to 5 represent similar parts, and therefore detailed description thereof will be omitted. FIG. 6 is a functional block diagram of a controller constituting the work machine according to the second embodiment of the present invention. Also in the following, description will be made of only the driving control (velocity control) of the boom cylinder 22 (hydraulic actuator 32). However, a similar description applies to the driving control (velocity control) of the arm cylinder 23 and the bucket cylinder 24.

The work machine according to the second embodiment of the present invention is different from that according to the first embodiment in that a method of arbitrating the first estimated velocity Vs_E1 and the second estimated velocity Vs_E2 (method of computing the arbitrated velocity Vs_Ar) in an estimated velocity arbitrating section 74A of a controller 60A shown in FIG. 6 is different. The estimated velocity arbitrating section 74 of the controller 60 according to the first embodiment computes the arbitrated velocity Vs_Ar by performing an arbitration using two coefficients, that is, the weight $\alpha$ and the weight $\beta$ for the first estimated velocity Vs_E1 and the second estimated velocity Vs_E2, so as to continuously change the ratio of the first estimated velocity Vs_E1 and the ratio of the second estimated velocity Vs_E2. On the other hand, the estimated velocity arbitrating section 74A according to the present embodiment basically computes the arbitrated velocity Vs_Ar by arbitrating the first estimated velocity Vs_E1 and the second estimated velocity Vs_E2 so as to switch to either one of the first estimated velocity Vs_E1 and the second estimated velocity Vs_E2 according to magnitude relation between the first estimated velocity Vs_E1 and a threshold value $\gamma$ (result of comparative determination). That is, the estimated velocity arbitrating section 74A sets a weight of 1 to either one of the first estimated velocity Vs_E1 and the second estimated velocity Vs_E2 and sets a weight of 0 to the other on the basis of the magnitude relation between the first estimated velocity Vs_E1 and the threshold value $\gamma$. When the magnitude relation between the first estimated velocity Vs_E1 and the threshold value $\gamma$ is opposite relation, the arbitrated velocity Vs_Ar is computed by performing an arbitration so as to reverse the weights (0 and 1 set to the first estimated velocity Vs_E1 and the second estimated velocity Vs_E2.

Specifically, the estimated velocity arbitrating section 74A of the controller 60A first determines whether or not the first estimated velocity Vs_E1 as a computation result of the first estimated velocity computing section 72 has reached the threshold value γ. When the hydraulic actuator 32 (boom cylinder 22) is accelerating, it is determined whether or not the first estimated velocity Vs_E1 is equal to or higher than the threshold value γ. When the hydraulic actuator 32 (boom cylinder 22) is decelerating, it is determined whether or not the first estimated velocity Vs_E1 is equal to or lower than the threshold value γ. The threshold value γ is, for example, set at a value of 80% of the requested velocity Vs_R as a computation result of the requested velocity computing section 71. The threshold value γ is set as a condition where the driving state of the hydraulic actuator 32 is assumed to have made a transition from a state of starting to move and to be approaching the steady state past the predetermined state. Specifically, the threshold value γ is set as a condition where the posture sensors 28*a*, 28*b*, and 28*c* of the third posture sensing device 28 can sense the driving state of the hydraulic actuator 32 substantially without being affected by a response delay of the hydraulic actuator 32 due to the inertia of the driven members 19, 20, and 21 of the front work device 3.

When the first estimated velocity Vs_E1 has not reached the threshold value γ, the estimated velocity arbitrating section 74A calculates the second estimated velocity Vs_E2, which is a computation result of the second estimated velocity computing section 73, as the arbitrated velocity Vs_Ar. That is, an arbitration is performed so as to set the weight for the first estimated velocity Vs_E1 to 0 and set the weight for the second estimated velocity Vs_E2 to 1.

When the first estimated velocity Vs_E1 has reached the threshold value γ, on the other hand, the estimated velocity arbitrating section 74A computes a rate limiting velocity V_rlmt for limiting an amount of change in the computation result of the arbitrated velocity Vs_Ar.

Specifically, when the first estimated velocity Vs_E1 at a time when the hydraulic actuator 32 (boom cylinder 22) is accelerating is equal to or higher than the rate limiting velocity V_rlmt as a result of the computation or when the first estimated velocity Vs_E1 at a time when the hydraulic actuator 32 (boom cylinder 22) is decelerating is equal to or lower than the rate limiting velocity V_rlmt, the first estimated velocity Vs_E1 is calculated as the arbitrated velocity Vs_Ar. That is, an arbitration is performed so as to set the weight for the first estimated velocity Vs_E1 to 1 and set the weight for the second estimated velocity Vs_E2 to 0. In addition, when the first estimated velocity Vs_E1 at the acceleration is lower than the rate limiting velocity V_rlmt or when the first estimated velocity Vs_E1 at the deceleration is higher than the rate limiting velocity V_rlmt, the rate limiting velocity V_rlmt is calculated as the arbitrated velocity Vs_Ar.

The estimated velocity arbitrating section 74A basically switches the setting of the arbitrated velocity Vs_Ar to either one of the first estimated velocity Vs_E1 and the second estimated velocity Vs_E2 by using the threshold value γ. However, when the amount of change in the computation result of the arbitrated velocity Vs_Ar is large at the switching between the first estimated velocity Vs_E1 and the second estimated velocity Vs_E2, control stability may be impaired by a steep change in the arbitrated velocity Vs_Ar. Accordingly, the amount of change at the switching of the arbitrated velocity Vs_Ar is limited by using the rate limiting velocity V_rlmt.

Specifically, for example, the rate limiting velocity V_rlmt is computed by using the following Equation (5).

[Equation 5]

$$V_{\_rlmt}=Vs_{\_E2}+R\times t\times(Vs_{\_E1}-Vs_{\_E2}) \quad \text{Equation (5)}$$

where Vs_E1 is the first estimated velocity, Vs_E2 is the second estimated velocity, R is a limitation rate, and t is an elapsed time from a time when the first estimated velocity Vs_E1 is determined to have reached the threshold value γ. The limitation rate R is, for example, a preset fixed value and is stored in the storage device 61 in advance.

An example of a control procedure performed by the controller in the work machine according to the second embodiment of the present invention will next be described with reference to FIG. 7. FIG. 7 is a flowchart illustrating an example of the control procedure of the controller in the work machine according to the second embodiment of the present invention which controller is shown in FIG. 6.

Figure 7:
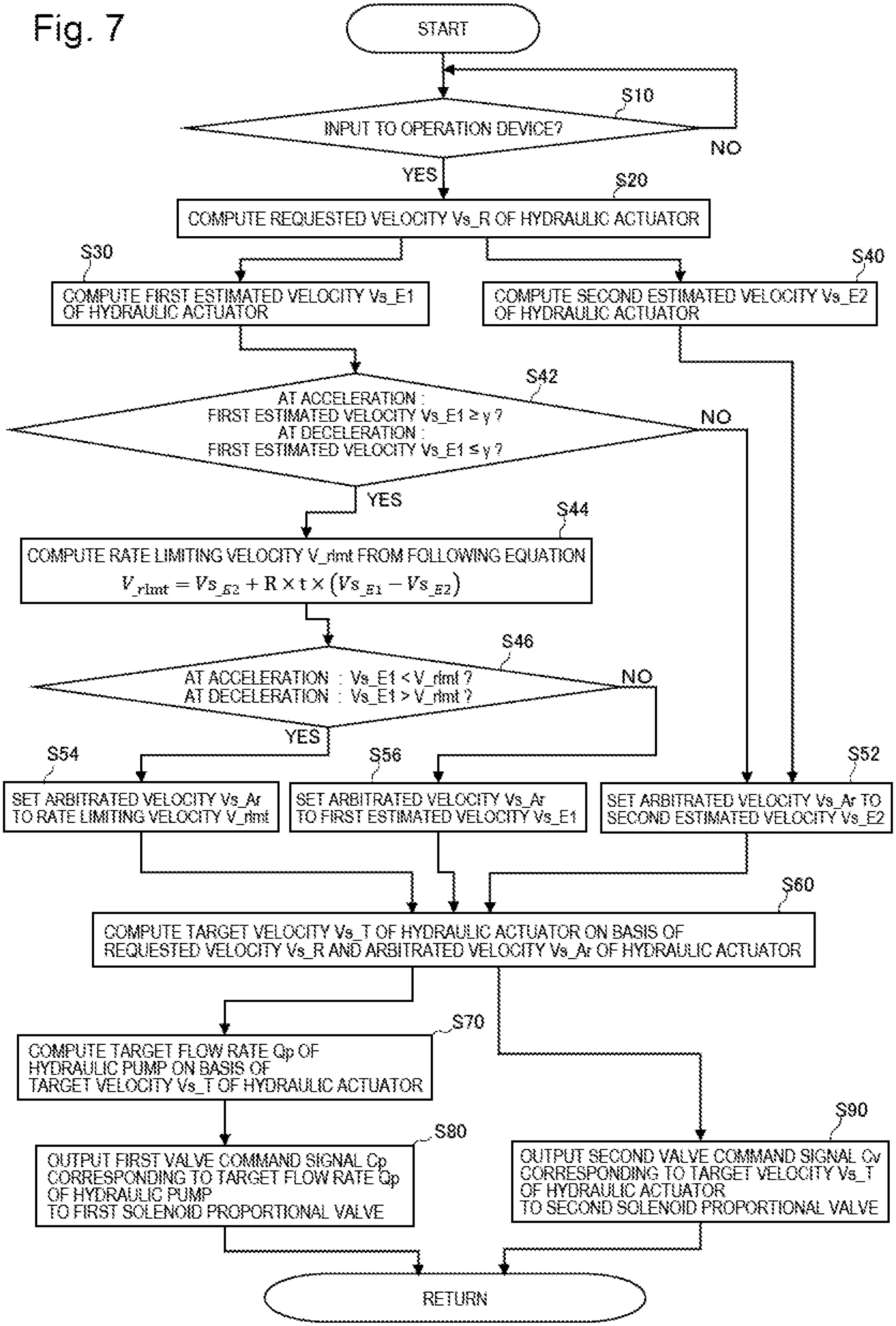
FIG. 7 is a flowchart illustrating an example of a control procedure for the controller in the work machine according to the second embodiment of the present invention which controller is shown in FIG. 6.

The control procedure of the controller 60A of the second embodiment shown in FIG. 7 is different from the control procedure of the controller 60 of the first embodiment shown in FIG. 4 in that a procedure for computing the arbitrated velocity Vs_Ar in steps S42 to S56 is performed in place of a procedure for computing the arbitrated velocity Vs_Ar in step S50 of the first embodiment. The other procedures, that is, steps S10 to S40 and S60 to S90 shown in FIG. 7 are similar to the procedures of the controller 60 of the first embodiment shown in FIG. 4, and description thereof will be omitted.

In FIG. 7, the controller 60A according to the present embodiment computes the arbitrated velocity Vs_Ar by performing the processing of steps S42 to S56.

Specifically, first, the estimated velocity arbitrating section 74A of the controller 60A determines whether or not the first estimated velocity Vs_E1 has reached the threshold value γ (step S42). When the hydraulic actuator 32 is accelerating, it is determined whether or not the first estimated velocity Vs_E1 is equal to or higher than the threshold value γ. When the hydraulic actuator 32 is decelerating, it is determined whether or not the first estimated velocity Vs_E1 is equal to or lower than the threshold value γ. When a result of the determination is YES, the procedure proceeds to step S44. When the result of the determination is NO, on the other hand, the procedure proceeds to step S52.

In a case of NO in step S42, the estimated velocity arbitrating section 74A calculates the second estimated velocity Vs_E2, which is a computation result in step S40, as the arbitrated velocity Vs_Ar (step S52). That is, an arbitration is performed so as to set the weight for the first estimated velocity Vs_E1 to 0 and set the weight for the second estimated velocity Vs_E2 to 1.

In a case of YES in step S42, on the other hand, the estimated velocity arbitrating section 74A computes the rate limiting velocity V_rlmt for limiting an amount of change in the arbitrated velocity Vs_Ar (step S44). The rate limiting velocity V_rlmt is, for example, computed from the above-described Equation (5) by using, the first estimated velocity Vs_E1, the second estimated velocity Vs_E2, the limitation rate R as a set value, and the elapsed time t from the time of making the determination of YES in step S42.

Next, when the hydraulic actuator 32 is accelerating, the estimated velocity arbitrating section 74A determines whether or not the first estimated velocity Vs_E1 is lower than the rate limiting velocity V_rlmt (step S46). In addition, when the hydraulic actuator 32 is decelerating, the estimated velocity arbitrating section 74A determines whether or not the first estimated velocity Vs_E1 is higher than the rate limiting velocity V_rlmt (step S46). When a result of the determination is YES, the procedure proceeds to step S54. When the result of the determination is NO, on the other hand, the procedure proceeds to step S56.

In a case of NO in step S46, the estimated velocity arbitrating section 74A calculates the first estimated velocity Vs_E1, which is a computation result in step S30, as the arbitrated velocity Vs_Ar (step S56). That is, an arbitration is performed so as to set the weight for the first estimated velocity Vs_E1 to 1 and set the weight for the second estimated velocity Vs_E2 to 0.

In a case of YES in step S46, on the other hand, the estimated velocity arbitrating section 74A calculates the rate limiting velocity V_rlmt, which is a computation result in step S44, as the arbitrated velocity Vs_Ar (step S54). This is an arbitration performed so as to limit, by the rate limiting velocity V_rlmt, an amount of change in the arbitrated velocity Vs_Ar at switching.

Motions and effects of the work machine according to the second embodiment of the present invention will next be described. In the following, in order to simplify the description, an operation of the hydraulic system in a case where a single operation of the boom is performed will be described with reference to FIG. 2 and FIG. 8. FIG. 8 is a diagram showing an example of temporal changes in results of computation of various kinds of estimated velocities of the hydraulic actuator by the controller with respect to input to the operation device in the work machine according to the second embodiment of the present invention. In FIG. 8, an upper diagram shows temporal changes in an example of an operation input amount to the operation device, and a lower diagram shows an example of temporal changes in various kinds of velocities of the boom cylinder as computation results of the controller with respect to the operation input amount shown in the upper diagram.

Figure 8:
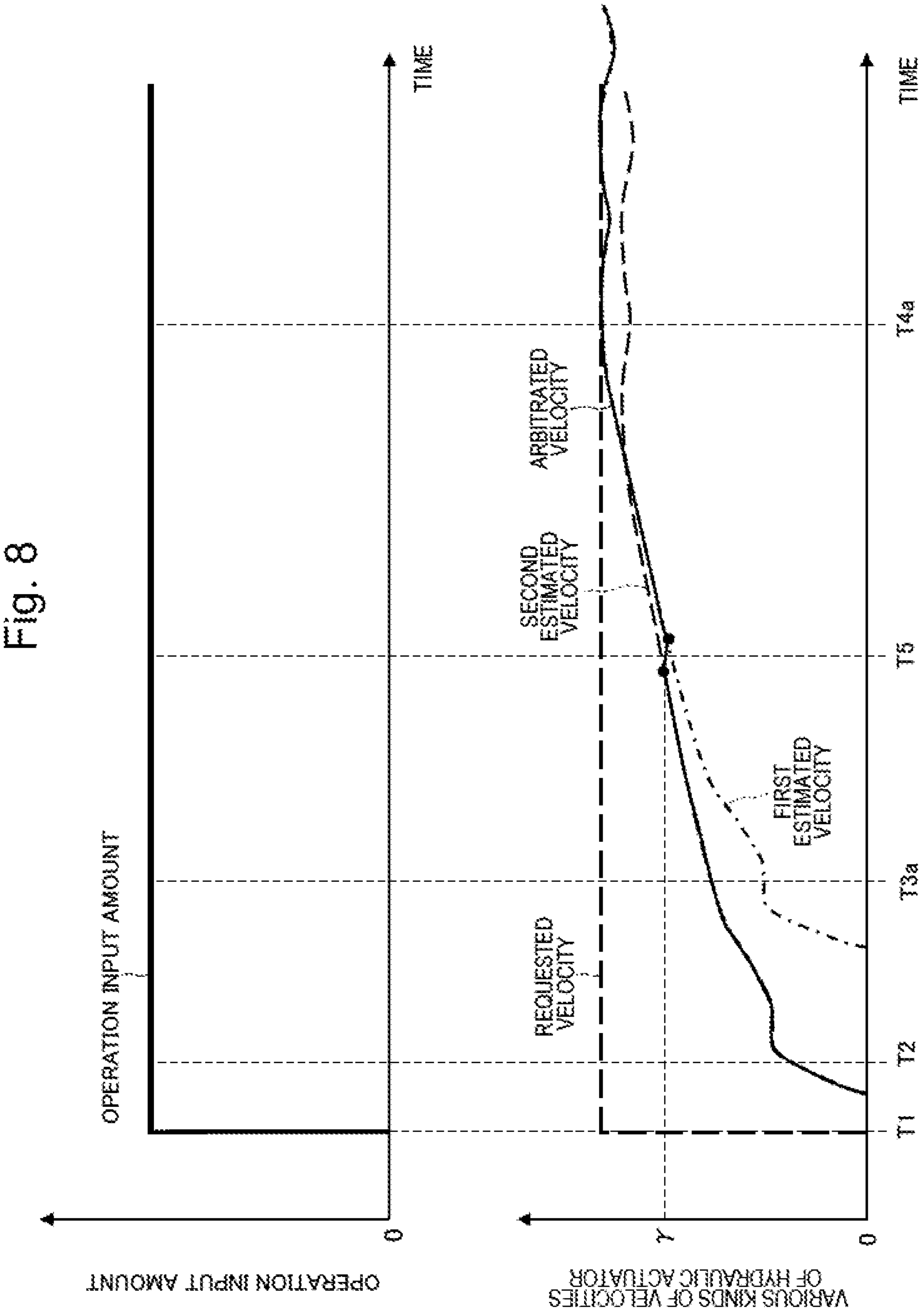
FIG. 8 is a diagram showing an example of temporal changes in computation results of various kinds of estimated velocities of a hydraulic actuator by the controller with respect to input to an operation device in the work machine according to the second embodiment of the present invention.

An operation input to the operation device 58, shown in the upper diagram of FIG. 8, is similar to the operation input to the operation device 58, shown in the upper diagram of FIG. 5 in the case of the first embodiment. Specifically, at time T1 shown in FIG. 8, a stepped operation input (solid line in the upper diagram of FIG. 8) is started to the operation device 58.

Thus, the controller 60A shown in FIG. 6 computes the requested velocity Vs_R of the boom cylinder 22 (long-dash broken line in the lower diagram of FIG. 8) which requested velocity corresponds to the operation input amount L from the operation device 58. This requested velocity Vs_R is similar to the requested velocity Vs_R indicated by the long-dash broken line in the lower diagram of FIG. 5 in the case of the first embodiment. The controller 60A outputs command signals to the hydraulic pump 31 and the directional control valve 332 based on the requested velocity Vs_R.

At time T2 shown in FIG. 8, as in the case of time T2 shown in FIG. 5 in the case of the first embodiment, the directional control valve 332 shown in FIG. 2 is opened according to the second valve command signals Cv from the controller 60A. The hydraulic fluid is thereby supplied to the boom cylinder 22. Therefore, the second estimated velocity Vs_E2 computed by the controller 60A based on the opening area of the directional control valve 332 and the differential pressure across the directional control valve 332 is a value that is not 0. Meanwhile, the boom 19 remains in a stop state due to an effect of inertia or the like. Thus, the third posture sensing device 28 senses the driving state of the boom cylinder 22 as the stop state. Therefore, the first estimated velocity Vs_E1 computed by the controller 60A based on the sensed values Si of the third posture sensing device 28 is 0. Therefore, as in the case of the first embodiment, the arbitrated velocity Vs_Ar is set to the second estimated velocity Vs_E2.

At time T3*a* shown in FIG. 8, as in the case of time T3 shown in FIG. 5 in the case of the first embodiment, the boom 19 has made a transition to a state of being in motion actually. Therefore, the third posture sensing device 28 senses an actual driving of the boom cylinder 22. The first estimated velocity Vs_E1 is consequently a value corresponding to the sensed values Si of the third posture sensing device 28. However, the boom cylinder 22 started to move only a short while ago, and thus the first estimated velocity Vs_E1 is a value lower than the threshold value γ. In this case, unlike the case of the first embodiment, the arbitrated velocity Vs_Ar is set to the second estimated velocity Vs_E2. This is synonymous with performing an arbitration so as to set the weight for the first estimated velocity Vs_E1 to 0 and set the weight for the second estimated velocity Vs_E2 to 1.

At time T5 shown in FIG. 8, the first estimated velocity Vs_E1 is higher than the threshold value γ. However, the first estimated velocity Vs_E1 is lower than the rate limiting velocity V_rlmt. Therefore, the arbitrated velocity Vs_Ar is arbitrated so as to be the rate limiting velocity V_rlmt without being switched from the second estimated velocity Vs_E2 to the first estimated velocity Vs_E1. The arbitrated velocity Vs_Ar is thereafter maintained at the rate limiting velocity V_rlmt. When the first estimated velocity Vs_E1 becomes higher than the rate limiting velocity V_rlmt, the arbitrated velocity Vs_Ar is switched from the rate limiting velocity V_rlmt to the first estimated velocity Vs_E1.

At time T4*a* after the passage of a considerable time from the operation input start time T1, the first estimated velocity Vs_E1 is higher than the threshold value γ and is higher than the rate limiting velocity V_rlmt. Therefore, the arbitrated velocity Vs_Ar is set to the first estimated velocity Vs_E1. That is, this is synonymous with performing an arbitration so as to set the weight for the first estimated velocity Vs_E1 to 1 and set the weight for the second estimated velocity Vs_E2 to 0.

In this way, in the present embodiment, when the boom cylinder 22 starts to move immediately after an operation input is started to the operation device 58, the driving control of the boom cylinder 22 is performed using only the second estimated velocity Vs_E2 predicted on the basis of the flow rate of the hydraulic fluid supplied to the boom cylinder 22 via the directional control valve 332. Immediately after the start of the operation input, there is a large effect of a response delay of the boom cylinder 22 due to the inertia of the boom 19. Hence, a deviation with respect to the requested velocity Vs_R corresponding to the operation input can be suppressed more than in a case of using the first estimated velocity Vs_E1 of the boom cylinder 22 computed on the basis of the actual driving state (substantially the stop state) of the boom cylinder 22. It is therefore possible to suppress occurrence of the jumping out or hunting of the boom cylinder 22 due to an excessive correction amount of the feedback control.

On the other hand, when the actual driving state of the boom cylinder 22 is close to a state corresponding to the operation input, the driving control of the boom cylinder 22 is performed by switching to the first estimated velocity Vs_E1 computed on the basis of the sensed value of the posture sensor 28*a* that senses the actual driving state of the boom cylinder 22. The first estimated velocity Vs_E1 is an estimate of the driving velocity of the boom cylinder 22 based on the actual driving state of the boom cylinder 22, and can result in a highly accurate estimated value. Hence, when the boom cylinder 22 is in a state close to a driving state corresponding to the operation of the operation device 58, the driving control of the boom cylinder 22 is performed by switching to the first estimated velocity Vs_E1, which is a more accurate estimated value than the second estimated velocity Vs_E2, and highly accurate control of the boom cylinder 22 can be achieved.

In the present embodiment, excellent control accuracy of the hydraulic actuator 32 can be achieved while the driving state of the boom cylinder 22 (hydraulic actuator 32) changes to a steady state from a state of starting to move.

In addition, in the present embodiment, limiting an amount of change in the arbitrated velocity Vs_Ar at switching between the first estimated velocity Vs_E1 and the second estimated velocity Vs_E2 allows a change in the arbitrated velocity Vs_Ar at the switching to be made smooth. It is thereby possible to ensure the stability of control using the arbitrated velocity Vs_Ar.

In addition, the actions and effects of the present embodiment are considered to be greatly exerted in a soil loading operation after an excavation of the hydraulic excavator as in the case of the first embodiment.

The controller 60A in the work machine according to the second embodiment described above of the present invention is configured to compute the arbitrated velocity Vs_Ar by performing an arbitration so as to switch to either one of the first estimated velocity Vs_E1 and the second estimated velocity Vs_E2. The computation of the arbitrated velocity Vs_Ar by the controller 60A is to calculate the second estimated velocity Vs_E2 as the arbitrated velocity Vs_Ar when the first estimated velocity Vs_E1 is lower than the threshold value $\gamma$ at an acceleration of the hydraulic actuator 32 or when the first estimated velocity Vs_E1 is higher than the threshold value $\gamma$ at a deceleration of the hydraulic actuator 32. On the other hand, the computation of the arbitrated velocity Vs_Ar by the controller 60A is to calculate the first estimated velocity Vs_E1 as the arbitrated velocity Vs_Ar when the first estimated velocity Vs_E1 is equal to or higher than the threshold value $\gamma$ at the acceleration of the hydraulic actuator 32 or when the first estimated velocity Vs_E1 is equal to or lower than the threshold value $\gamma$ at the deceleration of the hydraulic actuator 32. The threshold value $\gamma$ is set as a value of a predetermined ratio to the requested velocity Vs_R.

According to this configuration, an arbitration is performed such that the arbitrated velocity Vs_Ar is switched to the second estimated velocity Vs_E2 when the hydraulic actuator 32 starts to move. Thus, the driving of the hydraulic actuator 32 is controlled using the arbitrated velocity Vs_Ar as the second estimated velocity Vs_E2 predicting a future driving state of the hydraulic actuator 32. It is therefore possible to suppress control instability (hunting or the like) caused by an effect of a response delay of the hydraulic actuator 32 due to the inertia of the front work device 3. In addition, an arbitration is performed such that the arbitrated velocity Vs_Ar is switched to the first estimated velocity Vs_E1 when the driving state of the hydraulic actuator 32 is approaching the steady state past the predetermined state. Thus, the driving of the hydraulic actuator 32 is controlled using the arbitrated velocity as the first estimated velocity Vs_E1 derived on the basis of the actual driving state of the hydraulic actuator 32, and can therefore be controlled with higher accuracy than in a case of using the second estimated velocity Vs_E2 that is inferior in estimation accuracy to the first estimated velocity Vs_E1. That is, it is possible to perform highly accurate control of the hydraulic actuator 32 while ensuring control stability at a start of movement of the hydraulic actuator 32.

In addition, in the present embodiment, the computation of the arbitrated velocity by the controller is performed such that an amount of change before and after switching between the first estimated velocity and the second estimated velocity is limited.

According to this configuration, a change in the arbitrated velocity Vs_Ar can be made smooth by limiting an amount of change in the arbitrated velocity before and after switching between the first estimated velocity and the second estimated velocity. It is therefore possible to ensure the stability of control using the arbitrated velocity Vs_Ar.

Other Embodiments

It is to be noted that while an example has been illustrated in which the present invention is applied to a hydraulic excavator in the foregoing first to second embodiments, the present invention can be widely applied to various kinds of work machines having a work device driven by hydraulic actuators.

In addition, the present invention is not limited to the foregoing embodiments, but includes various modifications. The foregoing embodiments are described in detail to describe the present invention in an easily understandable manner, and are not necessarily limited to embodiments including all of the described configurations. For example, a part of a configuration of a certain embodiment can be replaced with a configuration of another embodiment, and a configuration of another embodiment can be added to a configuration of a certain embodiment. In addition, for a part of a configuration of each embodiment, another configuration can be added, deleted, or substituted.

For example, the foregoing embodiments illustrate an example of a configuration in which the current sensors 55 and 56 that sense the current value of the second valve command signals Cv to the second solenoid proportional valves 44 and 45 are used as a sensor that senses a physical quantity related to the opening area of the directional control valve 332. However, a configuration can also be adopted in which pressure sensors that sense pilot pressures input to the fluid pressure ports 332*a* and 332*b* of the directional control valve 332 or a spool displacement sensor that senses a displacement of a spool of the directional control valve 332 is used as the sensor. The opening area of the directional control valve 332 can be estimated by calculating a displacement amount of the spool of the directional control valve 332 on the basis of the pilot pressures sensed by the pressure sensors or a sensed value of the spool displacement sensor.

In addition, the foregoing first embodiment illustrates an example of a configuration in which the controller 60 computes the arbitrated velocity Vs_Ar by using the above-described Equation (2). That is, the example of the configuration is illustrated in which the arbitrated velocity Vs_Ar is computed by using two weights, that is, the weight $\alpha$ defined by the above-described Equation (3) and the weight $\beta$ defined by the above-described Equation (4). However, the controller 60 can also be configured to compute the arbitrated velocity Vs_Ar by using only the weight $\alpha$. In this case, the control accuracy of the hydraulic actuator may be inferior as compared with the case of using the two coefficients, that is, the weight $\alpha$ and the weight $\beta$.

In addition, the foregoing second embodiment illustrates an example of the controller 60A configured to compute the arbitrated velocity Vs_Ar by using the rate limiting velocity V_rlmt when the first estimated velocity Vs_E1 has reached the threshold value γ. However, the controller 60A can be configured to compute the arbitrated velocity Vs_Ar so as to switch to either one of the first estimated velocity Vs_E1 and the second estimated velocity Vs_E2 according to the magnitude relation (result of comparative determination) between the first estimated velocity Vs_E1 and the threshold value γ without using the rate limiting velocity V_rlmt. However, the amount of change in the arbitrated velocity Vs_Ar may change sharply, and consequently control stability may become lower than in the case of the configuration using the rate limiting velocity V_rlmt.

Summary

To summarize the above, the work machine according to the foregoing embodiments of the present invention includes: the hydraulic pump 31 that delivers the hydraulic fluid; the hydraulic actuator 32 that is driven by the hydraulic fluid supplied from the hydraulic pump 31; the directional control valve 332 that controls a flow of the hydraulic fluid to be supplied from the hydraulic pump 31 to the hydraulic actuator 32; the driven member 19, 20, or 21 that is actuated by driving of the hydraulic actuator 32; the operation device 58 that outputs an operation signal giving an instruction for motion of the driven member 19, 20, or 21; the third posture sensing device 28 (first sensing device) that senses motion information of the driven member 19, 20, or 21; the first pressure sensor 51, the second pressure sensors 52 and 53, and the current sensors 55 and 56 constituting a second sensing device that senses information related to a flow rate of the hydraulic fluid supplied to the hydraulic actuator 32 via the directional control valve 332; and the controller 60 or 60A that controls driving of the hydraulic pump 31 and the directional control valve 332. The controller 60 or 60A is configured to compute the requested velocity Vs_R of the hydraulic actuator 32 based on the operation signal of the operation device 58, compute a velocity of the hydraulic actuator 32 estimated on the basis of a sensed value of the third posture sensing device 28 (first sensing device), as the first estimated velocity Vs_E1, compute a velocity of the hydraulic actuator 32 estimated on the basis of sensed values of the first pressure sensor 51, the second pressure sensors 52 and 53, and the current sensors 55 and 56 (second sensing device) constituting the second sensing device, as the second estimated velocity Vs_E2, compute the arbitrated velocity Vs_Ar by arbitrating the first estimated velocity Vs_E1 and the second estimated velocity Vs_E2 according to a driving state of the hydraulic actuator 32, and control the driving of the hydraulic pump 31 and the directional control valve 332 based on a deviation between the requested velocity Vs_R and the arbitrated velocity Vs_Ar. The computation of the arbitrated velocity Vs_Ar by the controller 60 or 60A is to perform an arbitration such that a degree of effect on the second estimated velocity Vs_E2 is larger than a degree of effect on the first estimated velocity Vs_E1 when it can be determined on the basis of the first estimated velocity Vs_E1 that the driving state of the hydraulic actuator 32 is a state of starting to move, and perform an arbitration such that the degree of effect on the first estimated velocity Vs_E1 is larger than the degree of effect on the second estimated velocity Vs_E2 when it can be determined on the basis of the first estimated velocity Vs_E1 that the driving state of the hydraulic actuator 32 is approaching a steady state past a predetermined state.

According to this configuration, the driving of the hydraulic actuator 32 is controlled using the second estimated velocity Vs_E2 predicting a future driving state of the hydraulic actuator 32 when the driving state of the hydraulic actuator 32 is a state of starting to move. It is therefore possible to suppress the jumping out or hunting of the hydraulic actuator 32 due to an effect of a response delay of the hydraulic actuator 32 caused by the inertia of the driven members 19, 20, and 21. In addition, the driving of the hydraulic actuator 32 is controlled using the first estimated velocity Vs_E1 derived on the basis of the actual driving state of the hydraulic actuator 32 when the driving of the hydraulic actuator 32 is approaching the steady state. The driving of the hydraulic actuator 32 can therefore be controlled with higher accuracy than in a case of using the second estimated velocity Vs_E2 that is inferior in estimation accuracy to the first estimated velocity Vs_E1. That is, it is possible to perform highly accurate control of the hydraulic actuator 32 while ensuring control stability at a start of movement of the hydraulic actuator 32.

DESCRIPTION OF REFERENCE CHARACTERS

19: Boom (driven member)
20: Arm (driven member)
21: Bucket (driven member)
22: Boom cylinder (hydraulic actuator)
23: Arm cylinder (hydraulic actuator)
24: Bucket cylinder (hydraulic actuator)
28: Third posture sensor (first sensing device)
31: Hydraulic pump
332: Directional control valve
51: First pressure sensor (second sensing device)
52, 53: Second pressure sensor (second sensing device)
55, 56: Current sensor (second sensing device)
58: Operation device
60, 60A: Controller

The invention claimed is:

1. A work machine comprising:

a hydraulic pump that delivers hydraulic fluid;

a hydraulic actuator that is driven by the hydraulic fluid supplied from the hydraulic pump;

a directional control valve that controls a flow of the hydraulic fluid to be supplied from the hydraulic pump to the hydraulic actuator;

a driven member that is actuated by driving of the hydraulic actuator;

an operation lever that outputs an operation signal giving an instruction for motion of the driven member;

a first sensor that senses motion information of the driven member;

a second sensor that senses information related to a flow rate of the hydraulic fluid supplied to the hydraulic actuator via the directional control valve; and a controller that controls driving of the hydraulic pump and the directional control valve, wherein the controller is configured to compute a requested velocity of the hydraulic actuator based on the operation signal of the operation lever, compute a first estimated velocity of the hydraulic actuator estimated on a basis of a sensed value of the first sensor, compute a second estimated velocity of the hydraulic actuator estimated on a basis of a sensed value of the second sensor, perform an arbitration between the first estimated velocity and the second estimated velocity according to a driving state of the hydraulic actuator to compute an arbitrated velocity, and control the driving of the hydraulic pump and the directional control valve based on a deviation between the requested velocity and the arbitrated velocity, and the arbitration by the controller is such that a degree of effect of the second estimated velocity is larger than a degree of effect of the first estimated velocity when it can be determined on a basis of the first estimated velocity that the driving state of the hydraulic actuator is a state of starting to move, and such that the degree of effect of the first estimated velocity is larger than the degree of effect of the second estimated velocity when it can be determined on the basis of the first estimated velocity that the driving state of the hydraulic actuator is approaching a steady state past a predetermined state.

2. The work machine according to claim 1, wherein the arbitration by the controller is to increase the degree of effect of the second estimated velocity and relatively decrease the degree of effect of the first estimated velocity as a degree of deviation of the first estimated velocity with respect to the second estimated velocity is increased.

3. The work machine according to claim 2, wherein the arbitration by the controller is to increase the degree of effect of the first estimated velocity and relatively decrease the degree of effect of the second estimated velocity as a degree of deviation of the first estimated velocity with respect to the requested velocity is decreased.

4. The work machine according to claim 1, wherein the controller is configured to compute the arbitrated velocity by performing the arbitration so as to switch to either one of the first estimated velocity and the second estimated velocity, the computation of the arbitrated velocity by the controller is to calculate the second estimated velocity as the arbitrated velocity when the first estimated velocity is lower than a threshold value at a state of an acceleration of the hydraulic actuator or when the first estimated velocity is higher than the threshold value at a state of a deceleration of the hydraulic actuator, and calculate the first estimated velocity as the arbitrated velocity when the first estimated velocity is equal to or higher than the threshold value at the state of the acceleration of the hydraulic actuator or when the first estimated velocity is equal to or lower than the threshold value at the state of deceleration of the hydraulic actuator, and the threshold value is set as a value of a predetermined percentage to the requested velocity.

5. The work machine according to claim 4, wherein the computation of the arbitrated velocity by the controller is performed such that an amount of change before and after switching between the first estimated velocity and the second estimated velocity is limited.

* * * * *